(12) United States Patent
Takaoka

(10) Patent No.: US 6,798,903 B2
(45) Date of Patent: Sep. 28, 2004

(54) IMAGE PROCESSING METHOD, IMAGE PROCESSING DEVICE, RECORDING MEDIUM, AND TRANSMISSION MEDIUM

(75) Inventor: Naoki Takaoka, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 544 days.

(21) Appl. No.: 09/742,213

(22) Filed: Dec. 22, 2000

(65) Prior Publication Data

US 2001/0022853 A1 Sep. 20, 2001

(30) Foreign Application Priority Data

Dec. 24, 1999 (JP) .............................. 11-368274

(51) Int. Cl.[7] .................................................. G06K 9/00
(52) U.S. Cl. .................... 382/167; 396/158; 382/117; 345/591
(58) Field of Search ................................ 382/100, 162, 382/163, 164, 165, 167, 170, 173, 178, 151, 255, 257, 274, 168, 117; 356/402; 347/115; 358/500, 518; 345/591, 597; 396/158; 348/453, 370

(56) References Cited

U.S. PATENT DOCUMENTS

| | | | | |
|---|---|---|---|---|
| 4,768,089 A | * | 8/1988 | Kato | 348/71 |
| 5,003,326 A | * | 3/1991 | Suzuki et al. | 347/115 |
| 5,089,976 A | * | 2/1992 | Cate et al. | 356/402 |
| 5,130,789 A | * | 7/1992 | Dobbs et al. | 358/500 |
| 5,432,863 A | * | 7/1995 | Benati et al. | 382/167 |
| 6,631,208 B1 | * | 10/2003 | Kinjo et al. | 382/167 |

FOREIGN PATENT DOCUMENTS

| | | |
|---|---|---|
| JO | 200076427 | 3/2000 |
| JP | 772537 | 3/1995 |
| JP | 9261580 | 10/1997 |

* cited by examiner

Primary Examiner—Bhavesh M. Mehta
Assistant Examiner—Seyed Azarian
(74) Attorney, Agent, or Firm—Birch, Stewart, Kolasch & Birch, LLP

(57) ABSTRACT

An image processing method and image processing device extracting, from an image, a pupil region in which unsatisfactory color tone has arisen on the image; determining a target value of a characteristic amount of the pupil, on the basis of a characteristic amount of a region including a majority of the image, a characteristic amount of a region in a vicinity of the pupil region, and a characteristic amount of the pupil; and correcting a value of each pixel within the pupil region, such that the characteristic amount of the pupil region in which unsatisfactory color tone has arisen is substantially equal to the target value, are provided in order that unsatisfactory color tone of a pupil region within an image can be corrected such that the image can be finished with a natural feel.

19 Claims, 9 Drawing Sheets

DESIGNATE

DESIGNATE

FIG. 4A
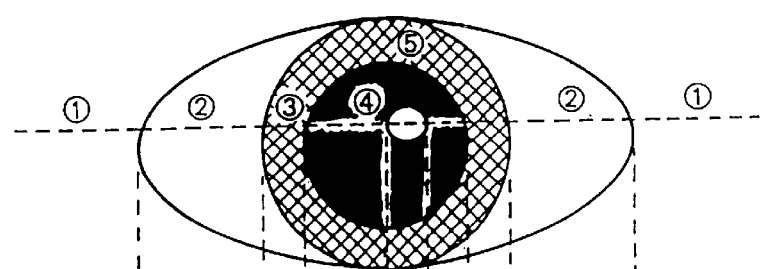
FIG. 4B
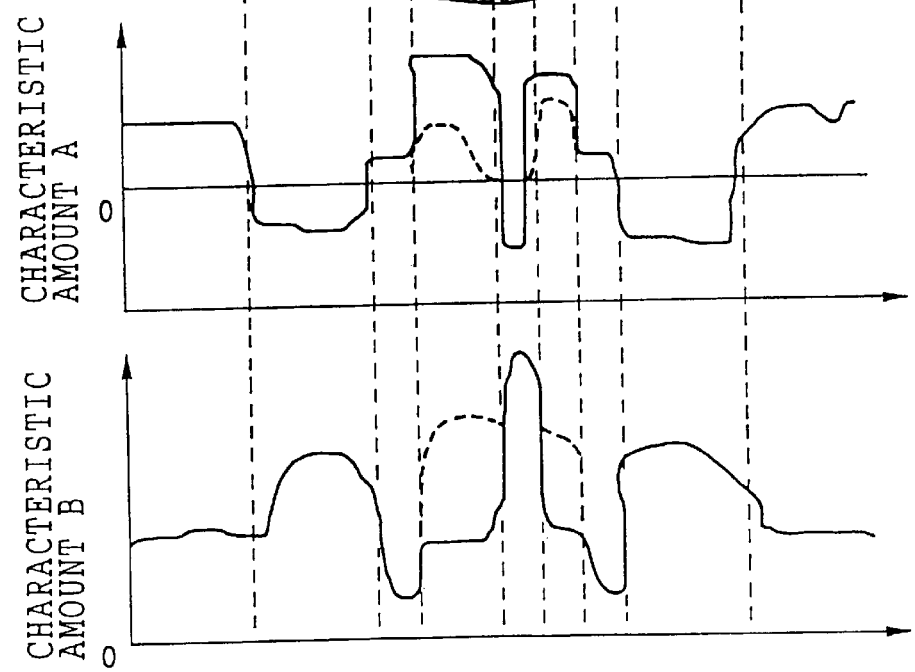
FIG. 4C

IMAGE PROCESSING METHOD, IMAGE PROCESSING DEVICE, RECORDING MEDIUM, AND TRANSMISSION MEDIUM

BACKGROUND OF THE INVENTION

1. Field of the Invention

The present invention relates to an image processing method, an image processing device, a recording medium, and a transmission medium. In particular, the present invention relates to an image processing method for correcting a pupil region in an image which corresponds to the pupil of a person and in which unsatisfactory color tone arises in the image, to an image processing device to which the image processing method is applied, to a recording medium on which a program is recorded for realizing the image processing method on a computer, and to a transmission medium for transmitting the program for realizing the image processing method by a computer.

2. Description of the Related Art

When a subject is photographed by a camera, the color tone of the subject in the photographed and recorded image may greatly differ from the actual color tone due to the reflected state of the light at the time of photographing. For example, when a person who is the subject is photographed from the front by using a flash, in a dark place, the flash light is, from the front, incident on and regularly reflects off of the eye portion of a person who has their pupils open. When this state is photographed and recorded as an image, the region (pupil region) corresponding to the pupil on the image may take on a red color (so-called "red-eye") or may take on a gold color (so-called "gold-eye"). Such an unsatisfactory color tone in the pupil region of an image has an extremely unnatural and unpleasant appearance. Thus, conventionally, various methods have been proposed for correcting the deficient color tone in the pupil region by image processing such that the pupil region will appear natural.

For example, Japanese Patent Application Laid-Open (JP-A) No. 7-72537 discloses the following technique. A region in which there is the possibility that unsatisfactory color tone of a pupil exists is determined. By comparing the hue or the brightness or the like of sampled pixels within this region with a threshold value, pixels which have the possibly of being an unsatisfactory color tone of a pupil are determined, and a region which corresponds to the main portion of a pupil having an unsatisfactory tone is determined. The RGB values of the respective pixels within this region are converted to YCC values, and the values of the chromaticity channels C1, C2 are set to zero so that the chromaticity is eliminated. A predetermined value (e.g., 0.35) which is less than one and which has been determined by experimentation is multiplied by the value of the brightness channel Y so as to lower the brightness. In this way, the unsatisfactory color tone is corrected.

Further, JP-A-9-261580 discloses the following technique. A pupil candidate region (a region which appears to be a pupil) is selected on the basis of color information within a region surrounded by an edge. Pixels having unsatisfactory color tone (red-eye) are extracted from the selected pupil candidate region. For each of the pixels, for example, the R, G, B values are made to coincide with the lowest of the R, G, B values, or the R value is made to coincide with the average value of G and B, or on the basis of color information of a color selected from a color sample by an operator, the R, G, B values are changed, so as to correct the unsatisfactory color tone.

However, the characteristic amounts (e.g., brightness, saturation, hue or the like) of a pupil region in a case in which there is no unsatisfactory color tone in the pupil region in the image, greatly differ in accordance with the photographing conditions, such as the lighting conditions, at the time of photographing. Thus, how the pupil region in an image in which unsatisfactory color tone arises should be corrected differs from image to image. Further, how the characteristic amounts of the pupil region vary from the appropriate values due to the unsatisfactory color tone also differs in accordance with the photographing conditions, such as, for example, the distance to the photographed subject or the like. Thus, it is difficult to estimate the appropriate values from the characteristic amounts of pupil regions in which unsatisfactory color tone arises.

In the technique disclosed in JP-A-7-72537, for a region which is judged to have an unsatisfactory color tone, the chromaticity is eliminated for each pixel, and correction is carried out uniformly by multiplying the brightness by a constant coefficient. Further, in the technique disclosed in JP-A-9-261580, correction is carried out only by using the characteristic amounts (specifically, the R, G, B values of each pixel) of a region judged to have unsatisfactory color tone. Thus, an image whose unsatisfactory color tone regions have been corrected often has an unnatural feel.

Further, there are many cases in which unsatisfactory color tone of the pupil regions arises in a pair of pupil regions corresponding to the pupils of both eyes of the same person. However, there are cases in which the degree of unsatisfactory color tone arising in the pair of pupil regions differs (for each pupil region) due to the angle at which the light of the flash is illuminated onto the person who is the subject, or the like. The technologies disclosed in the aforementioned publications do not take into consideration such correction of unsatisfactory color tone in a pair of pupil regions, and have the problem that a pair of pupil regions (and the overall image) are often finished with an unnatural feel due to the respective finishes of the pair of pupil regions after unsatisfactory color tone correction has been carried out greatly differing (for each pupil region).

SUMMARY OF THE INVENTION

In view of the aforementioned, a first object of the present invention is to provide an image processing method, an image processing device, a recording medium, and a transmission medium which enable correction of unsatisfactory color tone in pupil regions in an image so that the image will be finished with a natural feel.

A second object of the present invention is to provide an image processing method, an image processing device, a recording medium and a transmission medium which enable correction of unsatisfactory color tone within pupil regions such that a pair of pupil regions in an image, which correspond to the pupils of a single person, are finished with a natural feel.

As discussed above, characteristic amounts, such as brightness, saturation, hue, and the like of pupil regions in an image in cases in which unsatisfactory color tone does not arise therein (namely, desirable values of characteristic amounts of pupil regions for finishing the image with a natural feel) greatly differ in accordance with the photographing conditions such as the illumination conditions at the time of photographing. The characteristic amounts of a region including the majority portion of the image and the characteristic amounts of the region in the vicinity of the pupil regions within the image greatly differ in accordance with the photographing conditions regardless of whether or not unsatisfactory color tone has arisen in the pupil regions in the image. On the basis of these facts, the present inventors arrived at the present invention by hypothesizing that, for preferable values of characteristic amounts of pupil regions for finishing an image with a natural feel, the characteristic amounts of regions including the majority of the image and the characteristic amounts of the region in a vicinity of the pupil region are strongly correlated, and preferable values of the characteristic amounts of the pupil regions can be estimated from the characteristic amounts of the regions including the majority of the image and the characteristic amounts of the region in a vicinity of the pupil region.

On the basis of the above, in order to achieve the first object, an image processing method comprising the steps of: extracting, from an image, a pupil region which corresponds to a pupil of a person and in which unsatisfactory color tone has arisen on the image; determining a target value of a characteristic amount of the pupil region in which unsatisfactory color tone has arisen, on the basis of a characteristic amount of a region including a majority of the image, a characteristic amount of a region in a vicinity of the pupil region in which unsatisfactory color tone has arisen, and a characteristic amount of the pupil region in which unsatisfactory color tone has arisen; and correcting a value of each pixel within the pupil region in which unsatisfactory color tone has arisen, such that the characteristic amount of the pupil region in which unsatisfactory color tone has arisen is substantially equal to the target value as first aspect of the invention is provided.

In the invention of the first aspect, a pupil region, which corresponds to a pupil of a person and in which unsatisfactory color tone (e.g., red-eye, gold-eye, or the like) has arisen, is extracted from an image. The extraction of the pupil region in which unsatisfactory color tone has arisen may be carried out as follows for example. For each pixel of an image region which includes a pupil region in which unsatisfactory color tone has arisen (the region may be designated by an operator, or may be extracted automatically by image analysis), at least one characteristic amount of among brightness, saturation and hue is determined. A three-dimensional xyz space is set with the image region as the xy plane and the characteristic amount as the z axis. The xy plane is divided per region in which the z axis values (characteristic amounts) are distributed in a mountain-shape with respect to the spreading of the xy plane. On the basis of at least one of the configuration, position, surface area, and statistical characteristic amount on the xy plane of each divisional region, a pupil region which corresponds to the pupil of a person and in which unsatisfactory color tone has arisen is determined.

In the invention of the first aspect, the target value of the characteristic amount of the pupil region in which unsatisfactory color tone has arisen is determined on the basis of the characteristic amount of a region including the majority of the image, the characteristic amount of a region in the vicinity of the pupil region in which unsatisfactory color tone has arisen, and the characteristic amount of the pupil region in which unsatisfactory color tone has arisen. The region which includes the majority of the image (also referred to as "majority region") may be, for example, the entire image, or may be a region which remains after removing from the image the peripheral edge portion of the image or a region which is separated, by a fixed distance or more on the image, from the pupil region in which unsatisfactory color tone has arisen, or may be the majority of a trimmed region in the case that the region including the pupil region in which unsatisfactory color tone has arisen is trimmed from the image. Further, the region in the vicinity of the pupil region may be an arbitrary shape such as circular, oval, rectangular, a configuration resembling a pupil region, or the like. The size of the region in the vicinity of the pupil region may be varied in accordance with the surface area of the pupil region, or the size thereof may be fixed.

Any of various known characteristic amounts can be used as the characteristic amount. However, as in the second aspect of the present invention, at least one of the average value of brightness, the average value of saturation, the average value of hue, and a value corresponding to the minimum value of brightness (e.g., the minimum value of brightness or the brightness of a shadow portion), may be used as the characteristic amount of the region including the majority of the image, the characteristic amount of the region in the vicinity of the pupil region in which unsatisfactory color tone has arisen, and the characteristic amount of the pupil region in which unsatisfactory color tone has arisen. As the target value of the characteristic amount of the pupil region in which unsatisfactory color tone has arisen, a target value of an average value of brightness, a target value of an average value of saturation, and a target value of an average value of hue may be used.

As described above, the characteristic amount of a region including the majority of the image and the characteristic amount of the region in a vicinity of the pupil region in which unsatisfactory color tone has arisen are strongly correlated with a desirable value of the characteristics amount of the pupil region for finishing the image with a natural feel. Thus, as described above, by determining the target value of the characteristic amount of the pupil region by using the characteristic amount of the region including the majority of the image or the characteristic amount of the region in a vicinity of the pupil region in which unsatisfactory color tone has arisen, the target value of the characteristic amount of the pupil region can be determined such that the image can be finished with a natural feel.

In the invention of the first aspect, the value of each pixel within the pupil region in which unsatisfactory color tone has arisen is corrected such that the characteristic amount of a pupil region in which unsatisfactory color tone has arisen substantially coincides with the target value. Thus, the unsatisfactory color tone of the pupil region in the image can be corrected such that the image is finished with a natural feel. The correction of the value of each pixel within the pupil region such that the characteristic amount of the pupil region in which unsatisfactory color tone has arisen substantially coincides with the determined target value, is desirably carried out as follows for example: a conversion formula is determined which converts the value of each pixel such that the average value of the characteristic amounts of the pupil region in which unsatisfactory color tone has arisen substantially coincides with the determined target value. By converting the value of each pixel in accordance with this conversion formula, the value of each pixel can be corrected such that even the dispersion in the values of the respective pixels within the pupil region can be reflected.

In a case in which, as in the second aspect of the present invention, an average value of brightness and a value corresponding to the lowest value of brightness of the region including the majority of the image, are included in the characteristic amount of the region including the majority of the image, and the average value of the brightness of the region in the vicinity of the pupil region in which unsatisfactory color tone has arisen is included in the characteristic amount of the region in the vicinity of the pupil region in which unsatisfactory color tone has arisen, and the target value of the average value of brightness of the pupil region is included in the target value of the characteristic amount of the pupil region, it is preferable that, as in the third aspect of the present invention, the target value of the average value of the brightness of the pupil region is determined so as to be less than or equal to the average value of brightness of the region including the majority of the image, and so as to be less than or equal to a value corresponding to the minimum value of the brightness of the region in the vicinity of the pupil region, and so as to be greater than or equal to a value corresponding to the minimum value of the brightness in the region including the majority of the image.

Generally, the pupil region has a low brightness. Thus, by making the target value of the average value of brightness of the pupil region in which unsatisfactory color tone has arisen to be less than or equal to an average value of brightness of the region including the majority of the image, the target value can be made to be close to the desired brightness of the image. Generally, the brightness of the pupil region is less than the brightness of the eyelashes, the eyebrows or the iris at the periphery of the pupil. Thus, by making the target value of the average value of the brightness of the pupil region to be less than or equal to a value corresponding to the minimum value of the brightness of the region in a vicinity of the pupil region, the target value can be made to be close to the desirable brightness of the image.

Usually, an image which has been photographed by using a flash has low contrast. In such an image, if the brightness of the pupil region is too low, it will appear as if the brightness has been artificially lowered. Thus, by setting the target value of the average value of the brightness of the pupil region to be greater than or equal to a value corresponding to a minimum value of brightness of the region including the majority of the image, the target value can be prevented from becoming a value which is inappropriately low, and the target value can be made to be close to a desirable brightness of the image.

In this way, in accordance with the third aspect of the present invention, the target value of the average value of the brightness of the pupil region in which unsatisfactory color tone has arisen is determined such that the aforementioned respective conditions are satisfied. Thus, the target value of the average value of the brightness of the pupil region can be set to a value which is suitable for the image to be finished with a natural feel.

In the second aspect of the present invention, in a case in which the average value of the saturation of the region in a vicinity of the pupil region in which unsatisfactory color tone has arisen is included in the characteristic amount of the region in a vicinity of the pupil region in which unsatisfactory color tone has arisen, and the target value of the average value of the saturation of the pupil region is included in the average value of the characteristic amount of the pupil region, as in the fourth aspect of the present invention, it is preferable that the target value of the average value of the saturation of the pupil region is determined so as to be less than or equal to the average value of the saturation of the region in a vicinity of the pupil region and such that the achromaticity is not zero.

Generally, flesh colored regions take up a large surface area within the region in the vicinity of the pupil region, and the region in the vicinity of the pupil region includes regions corresponding to objects which are nearly achromatic (i.e., whose saturation is zero) such as eyelashes and eyebrows. Thus, the average value of the saturation of the region in the vicinity of the pupil region is a saturation value which is classified as being low saturation in the entire image. In the fourth aspect of the present invention, the target value of the average value of the saturation of the pupil region in which unsatisfactory color tone occurs is determined so as to be less than or equal to the average value of the saturation of the region in the vicinity of the pupil region and such that the saturation is not zero. Thus, the target value of the average value of the saturation of the pupil region can be made to be a value which is appropriate for the image to be finished with a natural feel.

In the second aspect of the present invention, in a case in which the average value of the hue of the region in the vicinity of the pupil region in which unsatisfactory color tone has arisen is included in the characteristic amount of the region in the vicinity of the pupil region in which unsatisfactory color tone has arisen, and the target value of the average value of the hue of the pupil region is included in the target value of the characteristic amount of the pupil region, as in the fifth aspect, the target value of the average value of the hue of the pupil region is preferably determined so as to be substantially equal to the average value of the hue of the region in the vicinity of the pupil region.

The inventors of the present application analyzed the results of functional evaluation on images in which pupil regions which had had unsatisfactory color tones were corrected, and found that the results of evaluation by functional evaluation of the hue of the pupil region after unsatisfactory color tone correction were better for hues corresponding to warm colors than for hues corresponding to achromatic colors. As described above, because flesh color regions take up a large surface area in the regions in a vicinity of the pupil region, the average value of the hue of the region in the vicinity of the pupil region is a value corresponding to a warm color. In the fifth aspect of the present invention, the target value of the average value of the hue of the pupil region in which unsatisfactory color tone has arisen is determined so as to be substantially equal to the average value of the hue of the region in a vicinity of the pupil region. Thus, the target value of the average value of the hue of the pupil region can be made to be an appropriate value having good functional evaluation results and resulting in an image with a natural feel.

In order to achieve the second object, a sixth aspect of the present invention is an image processing method comprising the steps of: extracting, from an image, a pupil region which corresponds to a pupil of a person and in which unsatisfactory color tone has arisen on the image; in a case in which a pair of pupil regions corresponding to a pair of pupils of the person exist in the image and unsatisfactory color tone has arisen in at least one pupil region of the pair of pupil regions, determining a target value of a characteristic amount of the pupil region in which unsatisfactory color tone has arisen such that characteristic amounts of the pair of pupil regions become substantially a same value; and correcting a value of each pixel in the pupil region in which unsatisfactory color tone has arisen, such that the characteristic amount of the pupil region in which unsatisfactory color tone has arisen is substantially equal to the determined target value.

In the sixth aspect of the present invention, when unsatisfactory color tone has arisen in at least one pupil region of a pair of pupil regions corresponding to a pair of pupils of the same person, the target value of the characteristic amount of the pupil region in which unsatisfactory color tone has arisen is determined such that the characteristic amounts of the pair of pupil regions become substantially the same values. Thus, after the unsatisfactory color tone of the pupil region in which unsatisfactory color tone has arisen has been corrected, the characteristic amounts of the pupil regions of the pair of pupil regions can be prevented from differing greatly.

In the sixth aspect of the present invention, the value of each pixel in the pupil region in which unsatisfactory color tone has arisen is corrected such that the characteristic amount of the region in which unsatisfactory color tone has arisen substantially coincides with the determined target value. Thus, the finishes of the respective pupil regions of the pair of pupil regions whose unsatisfactory color tones have been corrected are substantially the same, and the unsatisfactory color tones of the pupil regions can be corrected such that the pair of pupil regions in the image corresponding to a pair of pupils of the same person can be finished with a natural feel.

In the sixth aspect of the present invention, in a case in which unsatisfactory color tone arises in only one pupil region of a pair of pupil regions, the target value of the characteristic amount for the one pupil region may be determined, for example, on the basis of only the characteristic amount of the other pupil region in which no unsatisfactory color tone has arisen. As in the first aspect of the present invention, the target value may be determined by also taking into account the characteristic amount of the region including the majority of the image, the characteristic amount of the region in a vicinity of the pupil region in which unsatisfactory color tone has arisen, and the characteristic amount of the pupil region in which unsatisfactory color tone has arisen.

Moreover, in the sixth aspect of the present invention, in a case in which unsatisfactory color tone arises in both pupil regions of a pair of pupil regions, the target values of the characteristic amounts of the pupil regions may, for example, be determined by, after the target value of the characteristic amount of each pupil region is determined as in the first aspect, effecting correction such that the respective target values become substantially the same. Or, a single target value to be used for both pupil regions may be determined on the basis of the characteristic amount of the region including the majority of the image, the characteristic amounts of regions in vicinities of both pupil regions, and the characteristic amounts of both pupil regions. A seventh aspect of the present invention is an image processing device comprising: an extracting device for extracting, from an image, a pupil region which corresponds to a pupil of a person and in which unsatisfactory color tone has arisen on the image; a first determining device for determining a target value of a characteristic amount of the pupil region in which unsatisfactory color tone has arisen, on the basis of a characteristic amount of a region including a majority of the image, a characteristic amount of a region in a vicinity of the pupil region in which unsatisfactory color tone has arisen, and a characteristic amount of the pupil region in which unsatisfactory color tone has arisen; and a correcting device for correcting a value of each pixel in the pupil region in which unsatisfactory color tone has arisen, such that the characteristic amount of the pupil region in which unsatisfactory color tone has arisen is substantially equal to the target value.

Thus, in the same way as in the first aspect, the unsatisfactory color tone of the pupil region in the image can be corrected such that the image is finished with a natural feel.

An eighth aspect of the present invention is an image processing device comprising: an extracting device for extracting, from an image, a pupil region which corresponds to a pupil of a person and in which unsatisfactory color tone has arisen on the image; a second determining device for, in a case in which a pair of pupil regions corresponding to a pair of pupils of the person exist in the image and unsatisfactory color tone has arisen in at least one pupil region of the pair of pupil regions, determining a target value of a characteristic amount of the pupil region in which unsatisfactory color tone has arisen such that characteristic amounts of the pair of pupil regions become substantially a same value; and a correcting device for correcting a value of each pixel in the pupil region in which unsatisfactory color tone has arisen, such that the characteristic amount of the pupil region in which unsatisfactory color tone has arisen is substantially equal to the target value.

Thus, in the same way as in the sixth aspect, the unsatisfactory color tones of the pupil regions can be corrected such that the pair of pupil regions in the image corresponding to a pair of pupils of the same person can be finished with a natural feel.

A ninth aspect of the present invention is a recording medium on which is recorded a program for executing, at a computer, a process comprising: a first step of extracting, from an image, a pupil region which corresponds to a pupil of a person and in which unsatisfactory color tone has arisen on the image; a second step of determining a target value of a characteristic amount of the pupil region in which unsatisfactory color tone has arisen, on the basis of a characteristic amount of a region including a majority of the image, a characteristic amount of a region in a vicinity of the pupil region in which unsatisfactory color tone has arisen, and a characteristic amount of the pupil region in which unsatisfactory color tone has arisen; and a third step of correcting a value of each pixel within the pupil region in which the unsatisfactory color tone has arisen such that the characteristic amount of the pupil region in which the unsatisfactory color tone has arisen is substantially equal to the target value.

Instructions for executing the above-described steps 1 through 3, i.e., a program for realizing the image processing method of the first aspect on a computer, are recorded on the recording medium of the ninth aspect of the present invention. Thus, by a computer reading and executing the program recorded on the recording medium, in the same way as in the first aspect of the present invention, the unsatisfactory color tone of a pupil region in an image can be corrected such that the image is finished with a natural feel. A tenth aspect of the present invention is a recording medium on which is recorded a program for executing, at a computer, a process comprising: a first step of extracting, from an image, a pupil region which corresponds to a pupil of a person and in which unsatisfactory color tone has arisen is substantially equal to the target value.

Instructions for executing the above-described steps 1 through 3, i.e., a program for realizing the image processing method of the sixth aspect on a computer, are recorded on the recording medium of the tenth aspect of the present invention. Thus, by a computer reading and executing the program recorded on the recording medium, in the same way as in the sixth aspect of the present invention, the unsatisfactory color tones of a pair of pupil regions corresponding to the pair of pupils of the same person can be corrected such that the image is finished with a natural feel.

An eleventh aspect of the present invention is a transmission medium for transmitting a program for executing, at a computer, a process comprising: a first step of extracting, from an image, a pupil region which corresponds to a pupil of a person and in which unsatisfactory color tone has arisen on the image; a second step of determining a target value of a characteristic amount of the pupil region in which unsatisfactory color tone has arisen, on the basis of a characteristic amount of a region including a majority of the image, a characteristic amount of a region in a vicinity of the pupil region in which unsatisfactory color tone has arisen, and a characteristic amount of the pupil region in which unsatisfactory color tone has arisen; and a third step of correcting a value of each pixel within the pupil region in which unsatisfactory color tone has arisen, such that the characteristic amount of the pupil region in which unsatisfactory color tone has arisen is substantially equal to the target value.

The transmission medium of the eleventh aspect of the present invention transmits a program for realizing, by a computer, a process including the above-described steps 1 through 3, i.e., for realizing the image processing method of the first aspect. Thus, by a computer temporarily storing in a storing means a program which has been transmitted by the transmission medium, and thereafter, the computer reading the program from the storing means and executing the program, in the same way as in the first aspect, the unsatisfactory color tone of a pupil region in an image can be corrected such that the image is finished with a natural feel.

A twelfth aspect of the present invention is a transmission medium for transmitting a program for executing, at a computer, a process comprising: a first step of extracting, from an image, a pupil region which corresponds to a pupil of a person and in which unsatisfactory color tone has arisen on the image; a second step of, in a case in which a pair of pupil regions corresponding to a pair of pupils of the person exist in the image and unsatisfactory color tone has arisen in at least one pupil region of the pair of pupil regions, determining a target value of a characteristic amount for the pupil region in which the unsatisfactory color tone has arisen such that characteristic amounts of the pair of pupil regions become substantially a same value; and a third step of correcting a value of each pixel in the pupil region in which unsatisfactory color tone has arisen, such that the characteristic amount of the pupil region in which unsatisfactory color tone has arisen is substantially equal to the determined target value.

The transmission medium of the twelfth aspect of the present invention transmits a program for realizing, by a computer, a process including the above-described steps 1–3, i.e., for realizing the image processing method of the sixth aspect. Thus, by a computer temporarily storing in a storing means a program which has been transmitted by the transmission medium, and thereafter, the computer reading the program from the storing means and executing the program, in the same way as in the sixth aspect, the unsatisfactory color tones of a pair of pupil regions corresponding to the pupils of the same person can be corrected such that the image is finished with a natural feel.

BRIEF DESCRIPTION OF THE DRAWINGS

FIG. 4A is a plan view illustrating an example of an eye region.

FIG. 4B is a graph illustrating an example of a distribution of a characteristic amount A in the eye region.

FIG. 4C is a graph illustrating an example of a distribution of a characteristic amount B in the eye region.

DESCRIPTION OF THE PREFERRED EMBODIMENTS

Figure 1:
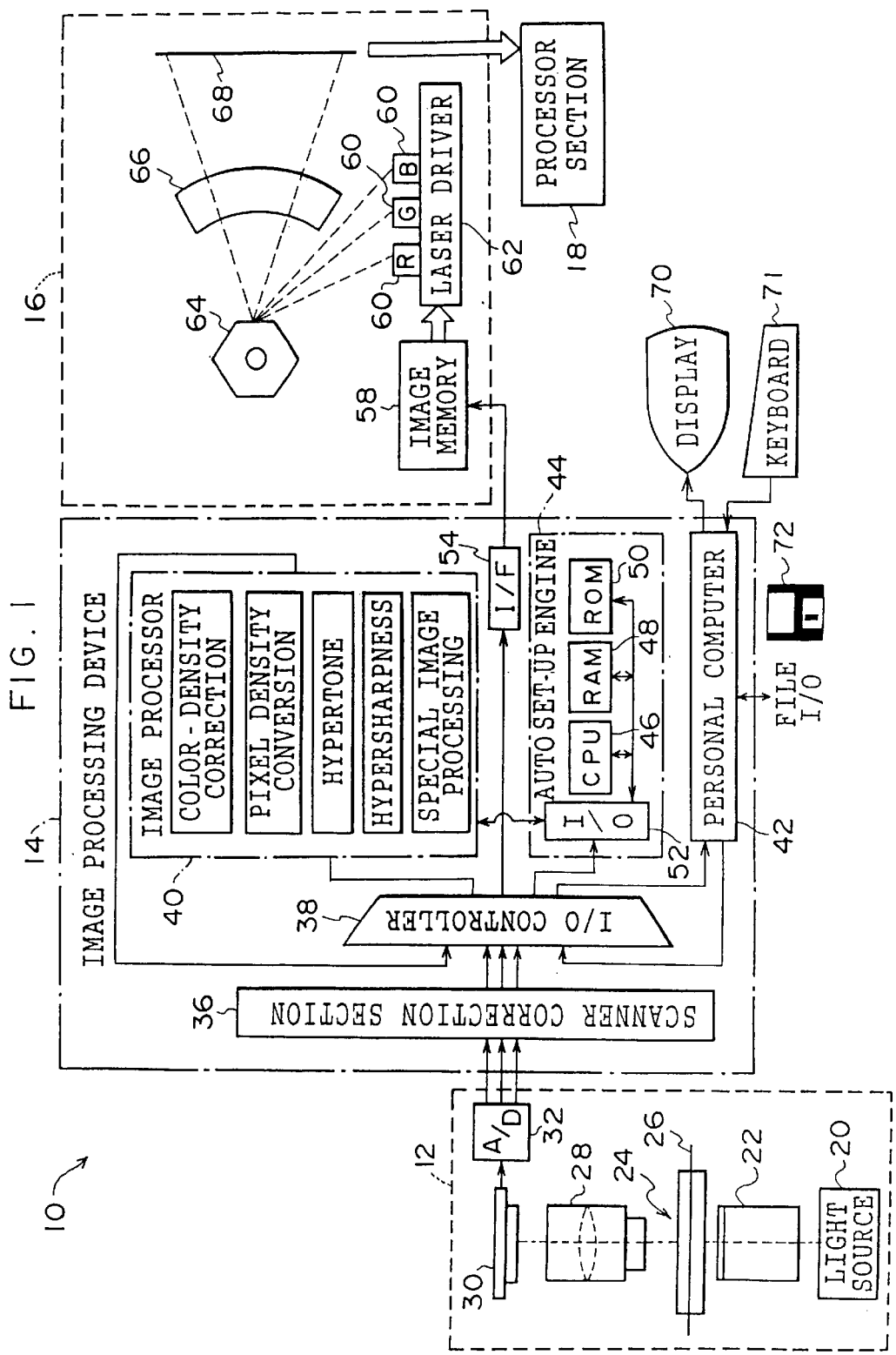
FIG. 1 is a schematic structural view of an image processing system relating to an embodiment of the present invention.

An example of an embodiment of the present invention will be described hereinafter in detail with reference to the drawings. FIG. 1 illustrates an image processing system 10 to which the present invention is applied. The image processing system 10 is formed by a scanner 12, an image processing device 14 and a printer 16 which are connected in series. The image processing device 14 corresponds to the image processing device of the present invention.

The scanner 12 reads a film image (a negative image or a positive image which becomes visible by developing processing after a subject has been photographed) recorded on a photographic photosensitive material (hereinafter simply referred to as "photographic film") such as a photographic film (e.g., a negative film or a reversal film). The scanner 12 outputs the image data obtained by reading. Light, which has been emitted from a light source 20 and whose non-uniformity of the light amount has been reduced by a diffusion box 22, is illuminated onto a photographic film 26 such as a negative film or a reversal film set at a film carrier 24. The light which passes through the photographic film 26 is focused onto the light-receiving surface of a CCD sensor 30 (either an area sensor or a line sensor suffices) via a lens 28.

The film carrier 24 conveys the photographic film 26 such that the portions on the photographic film 26 at which the film images are recorded are successively positioned on the optical axis of the light emitted from the light source 20. (If the CCD sensor 30 is an area sensor, the photographic film 26 is conveyed intermittently such that the respective film images are successively positioned on the optical axis. If the CCD sensor 30 is a line sensor, the photographic film 26 is conveyed continuously.) In this way, the film images recorded on the photographic film 26 are read in order by the CCD sensor 30, and signals corresponding to the film images are outputted from the CCD sensor 30. The signals outputted from the CCD sensor 30 are converted into digital image data by an A/D converter 32, and are inputted to the image processing device 14.

A scanner correction section 36 of the image processing device 14 carries out the following respective processings in order: dark correction for reducing the dark output level of the cells corresponding to the respective pixels from the inputted scan data (R, G, B data inputted from the scanner 12); density conversion for logarithmically converting the data which has been subjected to dark correction into data expressing density values; shading correction for correcting the converted density data in accordance with non-uniformity in the amount of light of the light illuminated onto the photographic film 26; and defective pixel correction for interpolating, from data of the surrounding pixels, data of a cell (a so-called defective pixel) for which a signal corresponding to the incident light amount is not outputted among the data subjected to shading correction, and then newly generating data for that cell. The output terminals of the scanner correction section 36 are connected to the input terminals of an I/O controller 38. The data, which has been subjected to the respective processings at the scanner correction section 36, is inputted to the I/O controller 38 as scan data.

An input terminal of the I/O controller 38 is connected to the data output terminal of an image processor 40. Image data, for which image processing (to be described in detail later) has been carried out, is inputted to this input terminal of the I/O controller 38 from the image processor 40. Further, an input terminal of the I/O controller 38 is connected to a personal computer 42. The personal computer 42 has an expansion slot (not shown). Drivers (not shown) for reading/writing data from/onto information recording media such as memory cards, CD-Rs, MOs, and the like, and communications control device for carrying out communication with other information processing machines are connected to the expansion slot. When file image data is inputted from the exterior via the expansion slot, the inputted file image data is inputted to the I/O controller 38.

The output terminals of the I/O controller 38 are connected to the data input terminal of the image processor 40, an auto set-up engine 44, and the personal computer 42, and to the printer 16 via an I/F circuit 54. The I/O controller 38 selectively outputs the inputted image data to respective devices connected to the output terminals of the I/O controller 38.

In the present embodiment, the respective film images recorded on the photographic film 26 are each read twice by the scanner 12, with each reading being carried out at a different resolution. In the first reading which is carried out at a relatively low resolution (hereinafter, prescanning), and in cases in which the density of the film image is relatively low (e.g., an underexposed negative image on a negative film), the entire surface of the photographic film 26 is read under reading conditions which are determined such that saturation of the accumulated charges at the CCD sensor 30 does not occur. (The reading conditions are the light amounts in each of the wavelength regions of R, G, B of the light illuminated onto the photographic film 26, and the charge accumulating time of the CCD sensor 30.) The data obtained by prescanning (prescan data) is inputted to the auto set-up engine 44 from the I/O controller 38.

The auto set-up engine 44 includes a CPU 46, a RAM 48 (e.g., a DRAM), a ROM 50 (e.g., a ROM whose stored contents are rewritable), and an input/output port 52, which are connected together via busses. On the basis of the prescan data inputted from the I/O controller 38, the auto set-up engine 44 determines the frame position of the film image, and extracts the data (prescan image data) corresponding to the film image recorded region on the photographic film 26. Further, on the basis of the prescan image data, the auto set-up engine 44 determines the size of the film image, computes the image characteristic amounts such as the densities, and determines the reading conditions for the time that the second reading is carried out by the scanner 12 at a relatively high resolution (hereinafter called fine scanning). Then, the auto set-up engine 44 outputs the frame position and the reading conditions to the scanner 12.

Further, on the basis of the prescan image data, the auto set-up engine 44 computes various types of image characteristic amounts of the film image, automatically determines (set-up computation), by computation, processing conditions for the respective types of image processings on the image data (the fine scan image data) obtained by the scanner 12 carrying out fine scanning, and outputs the determined processing conditions to the image processor 40.

A display 70, a keyboard 71, and a mouse (not shown) are connected to the personal computer 42. The personal computer 42 reads the prescan image data from the auto set-up engine 44, and fetches the processing conditions for the image processing determined by the auto set-up engine 44. On the basis of the fetched processing conditions, the personal computer 42 subjects the prescan image data to image processings which are equivalent to image processings which would be carried out by the image processor 40 on the fine scan image data, so as to generate simulation image data.

The generated simulation image data is converted into signals for displaying the image on a display 70. The simulation image is displayed on the display 70 on the basis of the signals. Further, when the operator inspects the image quality and the like of the displayed simulation image and inputs, via the keyboard and as the results of inspection, information designating correction of the processing conditions, this information is outputted to the auto set-up engine 44. In this way, at the auto set-up engine 44, processing such as recomputation of the processing conditions for image processing is carried out.

On the other hand, the image data (fine scan image data) inputted to the I/O controller 38 by the scanner 12 carrying out fine scanning on the film image, is inputted to the image processor 40 from the I/O controller 38. The image processor 40 includes various image processing circuits for carrying out color/density correction processing including gradation conversion and color conversion; pixel density conversion processing; hypertone processing for compressing the gradation of the extremely low frequency luminance components of the image; hypersharpness processing for enhancing the sharpness while suppressing graininess; and the like. The image processor 40 carries out, on the inputted image data, various types of image processings in accordance with the processing conditions determined and notified for each of the images by the auto set-up engine 44.

In addition to the above-listed image processings, other image processings which can be carried out by the image processor 40 include sharpness correction or soft focus processing for the entire image or a portion of the image (e.g., the region corresponding to the face of a person); image processings for intentionally changing the feeling (atmosphere) of the image (image processing for imparting a monotone finish to the output image, image processing for imparting a portrait finish to the output image, image processing for imparting a sepia-tone finish to the output image, and the like); and special image processings for manipulating the image (e.g., image processing for making a person appearing in the original image appear thinner on the main image, and the like).

In the present embodiment, as one example of such special image processing, a pupil region which corresponds to the pupil of a person, and an unsatisfactory color tone pupil region which corresponds to the pupil of a person and in which an unsatisfactory color tone such as red-eye or gold-eye or the like has arisen, are extracted, and pupil region color tone correction processing for correcting the color tone of the unsatisfactory color tone pupil region is carried out. The processing conditions for the pupil region color tone correction processing are determined by the personal computer 42 on the basis of the prescan image data (as will be described in detail later).

When the image data on which the image processing has been carried out at the image processor 40 is used for recording an image onto photographic printing paper, the image data on which image processing has been carried out at the image processor 40 is outputted, as image data for recording, from the I/O controller 38 via the I/F circuit 54 to the printer 16. When the image data which has been subjected to image processing is to be outputted to the exterior as an image file, the image data is outputted from the I/O controller 38 to the personal computer 42. In this way, at the personal computer 42, the image data inputted from the I/O controller 38 for output to the exterior, is outputted to the exterior (the aforementioned driver or communications control device) as an image file via the expansion slot.

The printer 16 has an image memory 58, laser light sources 60 of R, G, B, and a laser driver 62 which controls operation of the laser light sources 60. The image data for recording which is inputted from the image processing device 14 is, after being temporarily stored in the image memory 58, read, and is used for modulating the laser lights of R, G, B emitted from the laser light sources 60. The laser lights emitted form the laser light sources 60 are scanned on a photographic printing paper 68 via a polygon mirror 64 and an fθ lens 66, such that an image is exposed and recorded on the photographic printing paper 68. The photographic printing paper 68 on which an image is exposed and recorded is sent to the processor section 18 and is subjected to the respective processes of color developing, bleaching/fixing, washing and drying. In this way, the image which is exposed and recorded on the photographic printing paper 68 is made visible.

As operation of the present embodiment, description will be given of pupil region color tone correction condition determination processing which is carried out at the personal computer 42 by prescan data being inputted to the image processing device 14 from the scanner 12, and the prescan image data, from which prescan data has been cut-out, being sent to the personal computer 42 from the auto set-up engine 44.

The pupil region color tone correction set-up processing is processing to which the image processing method relating to the present invention is applied. This processing is realized by a pupil region color tone correction condition determination program being implemented by the CPU of the personal computer 42. The pupil region color tone correction condition determination program is initially stored in an information storage medium 72 (see FIG. 1), together with programs for executing other processings at the CPU 46. Note that in FIG. 1, the information storage medium 72 is shown as a floppy disk, but may be a CD-ROM, a memory card, an MO, a DVD, or the like. When the information storage medium 72 is loaded into an information reading device (not shown) connected to the personal computer 42 and an instruction is given to install the program in the image processing device 14 from the information storage medium 72, the pupil region color tone correction condition determination program and the like are read from the information storage medium 72 by the information reading device, and are stored in a storage means (e.g., a hard disk or the like) whose contents are rewritable.

When it is time to execute the pupil region color tone correction condition determination processing, the pupil region color tone correction condition determination program is read from the storage means, and is implemented by the CPU of the personal computer 42. The personal computer 42 of the image processing device 14 thereby functions as the image processing device relating to the present invention. In this way, the information recording medium 72, on which the pupil region color tone correction condition determination program and the like are stored, corresponds to the recording medium of the ninth and tenth aspects of the present invention.

The pupil region color tone correction condition determination processing, to which the image processing method relating to the present invention is applied, will be described hereinafter with reference to the flowchart of FIG. 2. Hereinafter, processing for a single film image will be described. However, the processing which is explained hereinafter is actually carried out by the personal computer 42 with each of the film images recorded on the photographic film 26 being the image which is the object of processing.

When prescan image data of a single film image (the film image which is the object of processing) is forwarded from the auto set-up engine 44, in step 100, the processing conditions of the image processing determined for the film image which is the object of processing are fetched from the auto set-up engine 44. On the basis of the fetched processing conditions, image processing, which is equivalent to image processing carried out at the image processor 40 on the fine scan image data, is carried out on the prescan image data so as to generate simulation image data. The generated simulation image data is converted to signals for displaying an image on the display 70, and the image (the simulation image) is displayed on the display 70 on the basis of these signals.

In subsequent step 102, if there is an unsatisfactory color tone pupil region in the simulation image displayed on the display 70 (i.e., if there is a region which corresponds to the pupil of a person and in which unsatisfactory color tone such as red-eye or gold-eye has arisen), a message requesting the operator to designate a region which is the object of processing, which includes this region, is displayed on the display 70, and the operator designates the region which is the object of processing. In this way, if there is an unsatisfactory color tone pupil region in the image displayed on the display 70, the operator operates the keyboard 71 or the mouse or the like, and designates the region which is the object of processing which includes the unsatisfactory color tone pupil region.

In the present embodiment, there are the following six designation modes which are designation modes for the operator to designate a region which is the object of processing which includes the unsatisfactory color tone pupil region: both eyes designation mode A, both eyes designation mode B, single designation mode A, single designation mode B, single designation mode C, and single designation mode D. The operator can designate the region which is the object of processing by using any of these designation modes.

Figure 3A:
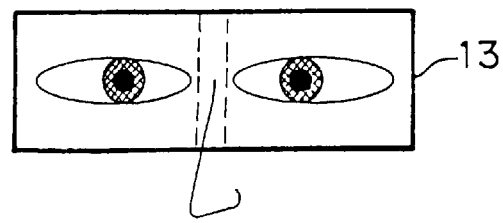
FIGS. 3A through 3F are schematic views for explanation of an example of a mode for designating a region which is an object of processing.

The both eyes designation modes A, B are modes for designating a region which is the object of processing, such that a pair of eye regions, which correspond to the eyes of a single person, are included therein. These modes are used to designate a region which is the object of processing in a case in which unsatisfactory color tone arises in each of the pair of pupil regions corresponding to the pupils of a single person. As illustrated in FIG. 3A, in the both eyes designation mode A, the operator operates the mouse or the keyboard 71 or the like, and designates a region including regions which are the object of processing by drawing, on the screen of the display 70, a frame 13 which demarcates a rectangular region including the pair of eye regions and peripheral regions thereof.

When the region is designated by the both eyes designation mode A, the designated region is divided, into a pair of regions, at positions of the designated region which are located a distance from the corresponding end of the designated region, which distance is a predetermined ratio with respect to the length of the designated region. (One example of a dividing positions are shown by the broken lines in FIG. 3A.) The obtained pair of regions are set as the regions which are objects of processing. The aforementioned predetermined ratio is a value obtained by statistically computing the ratio between the length of the designated region and the longitudinal axis direction length of the oval eye region corresponding to the eye of a person. Each of the regions which are objects of processing includes a single eye region, and are set so as to not include the region corresponding to a central portion between the eyebrows of the person. Note that the configuration of the frame 13 (the designated region) may be another shape such as oval or the like.

Figure 3B:
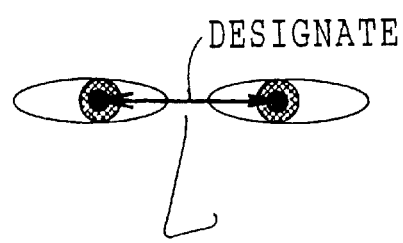

In the both eyes designation mode B, as illustrated in FIG. 3B, the operator operates the mouse or the keyboard 71 or the like, and designates a central position of each of the pair of pupil regions, so as to designated a region including regions which are objects of processing. When the region is designated by the both eyes designation mode B, a pair of oval regions, whose center portions are the designated central positions, and for each of which, a half of the longitudinal axis direction length thereof is a predetermined ratio with respect to the interval between the designated central positions of the pair of pupil regions, are set as the regions which are objects of processing. This predetermined ratio is obtained by statistically computing the ratio between the interval between the central positions of the pair of pupil regions and the longitudinal axis direction length of the eye region.

In the both eyes designation mode A and the both eyes designation mode B, it is possible that a region including the pair of eye regions is the region which is the object of processing, without the designated region being divided into regions which are objects of processing which each include a single pupil region. In this case, the processings which will be described hereinafter may be carried out for the both pupil regions at the same time.

The single designation modes A through D are modes for designating a region which is the object of processing which includes only one eye region. These modes are used for designating the region which is the object of processing in a case in which unsatisfactory color tone has arisen in only one of the pair of pupil regions corresponding to the pupils of a single person, or in a case in which only one of the pair of pupil regions exists within the image and there is unsatisfactory color tone in that pupil region (e.g., a portion of the region corresponding to the face of a person, which portion includes one eye region, is missing from the image).

Figure 3C:
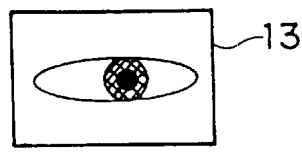

As illustrated in FIG. 3C, in the single designation mode A, the operator operates the mouse or the keyboard 71 or the like, and designates the region which is the object of processing by drawing, on the screen of the display 70, the frame 13 which demarcates a rectangular region including a single eye region and the peripheral region thereof. The region within the drawn frame 13 is set as the region which is the object of processing. In this case, the shape of the frame 13 (the designated region) may be another shape such as oval or the like.

Figure 3D:
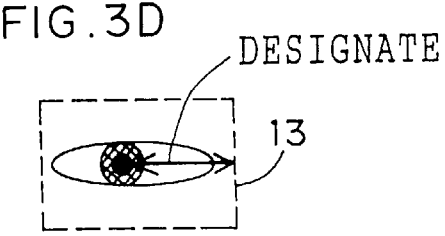

In the single designation mode B, as illustrated in FIG. 3D, the operator designates the central position of the pupil region, and designates the position of a frame so as to include the eye region. In this way, the region which is the object of processing is designated. On the basis of the positional relationship between the designated central position of the pupil region and the designated position of the frame, the frame 13 is set automatically so as to include a single eye region, and the region within the frame 13 is set as the region which is the object of processing.

Figure 3E:
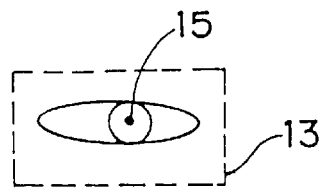

In the single designation mode C, as illustrated in FIG. 3E, the operator designates the region which is the object of processing by designating an eye region or the central position (denoted by reference numeral 15 in the drawing) of the pupil region, or by designating a specific position of the peripheral portion of the eye region. On the basis of the designated position, the frame 13 of a given size is set automatically so as to include the single eye region, and the region within this frame 13 is set as the region which is the object of processing.

Figure 3F:
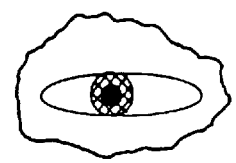

Further, in the single designation mode D, as illustrated in FIG. 3F, the operator operates the mouse or the keyboard 71 or the like, and moves a pointer along a border of a region including the eye region and the region at the periphery thereof so as to draw a frame (the locus of movement of the pointer) representing the border. In this way, the region which is the object of processing is designated, and the region within the drawn frame is set as the region which is the object of processing.

In subsequent step 104, a determination is made as to whether the region which is the object of processing has been designated for the image which is the object of processing. If the answer to the determination is negative, the processing ends. However, if a region which is the object of processing has been designated by any of the aforementioned designation modes, the determination in step 104 is affirmative, and the routine moves on to step 106 where a characteristic amount of each portion (e.g., each pixel) within the region which is the object of processing is computed in order to extract the unsatisfactory color tone pupil region from the region which is the object of processing. The characteristic amount may be characteristic amounts such as the following which are determined from, for example, the hue, saturation and brightness.

As one example, the redness value r which expresses redness is large in a pupil region in which the unsatisfactory color tone known as red-eye (hereinafter, merely referred to as "red-eye") has arisen. The sign of the redness value r is negative in a pupil region corresponding to a blue color type eye. Further, the gray value d which expresses brightness is large at regions corresponding to catch-light portions (portions having a high brightness at which the light source is taken in at the time of photographing) among the eye region, as well as at regions corresponding to the whites of eyes. The gray value d is low at regions corresponding to irises of brown color type pupils. As a result, along a line passing along the longitudinal axis direction of the eye region (the line which connects the corners of the eye, see FIG. 4A), the redness value r (characteristic amount A) has a distribution such as that shown in FIG. 4B, and the gray value d (characteristic amount B) has a distribution such as that shown in FIG. 4C.

In FIGS. 4B and 4C, the solid lines express the distributions of the respective characteristic amounts in cases in which the unsatisfactory color tone known as red-eye arises in the pupil region, and the broken lines express the distributions of the respective characteristic amounts in cases in which the unsatisfactory color tone known as gold-eye arises in the pupil region. When the unsatisfactory color tone known as gold-eye arises, the amount of light reflected from the pupil is relatively large. Thus, the hue of a pupil region in which the unsatisfactory color tone known as gold-eye (hereinafter merely "gold-eye") arises nears yellow (the value of characteristic amount A (the redness value r) is small), and the brightness (the value of characteristic amount B corresponding to the gray value (brightness)) is high.

As a result, in the present embodiment, the characteristic amount C defined by the following formula is used as the characteristic amount for dividing (as will be described later) the region which is the object of processing into plural regions. (Note that in the following formula, the characteristic amount A is the redness value r, and the characteristic amount B is the gray value d.)

$$C = \alpha \times B + (1-\alpha) \times |A| \qquad (1)$$

Figure 5:
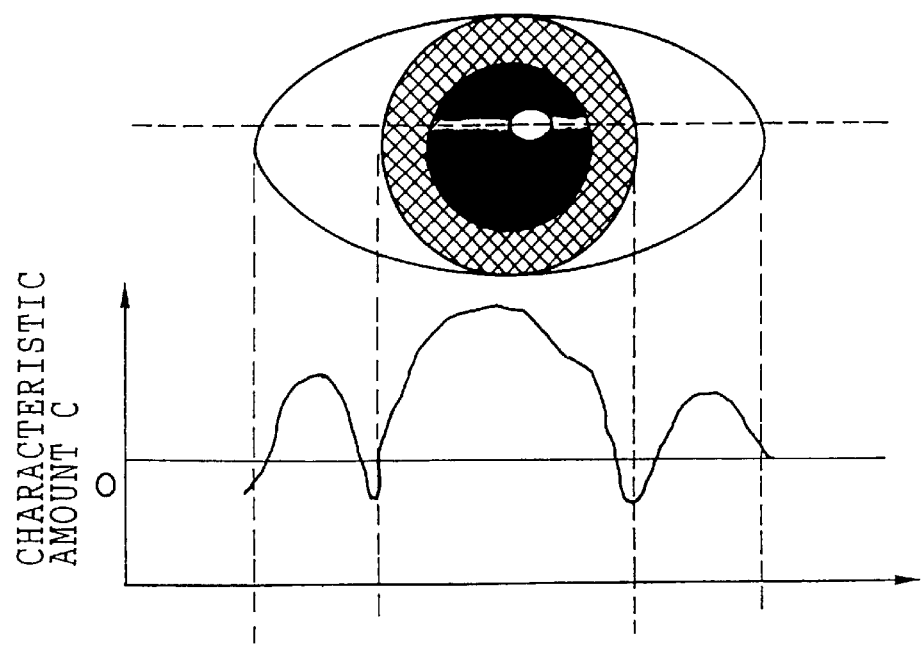
FIG. 5 is a graph illustrating an example of a distribution of a characteristic amount C in an eye region.
Figure 6:
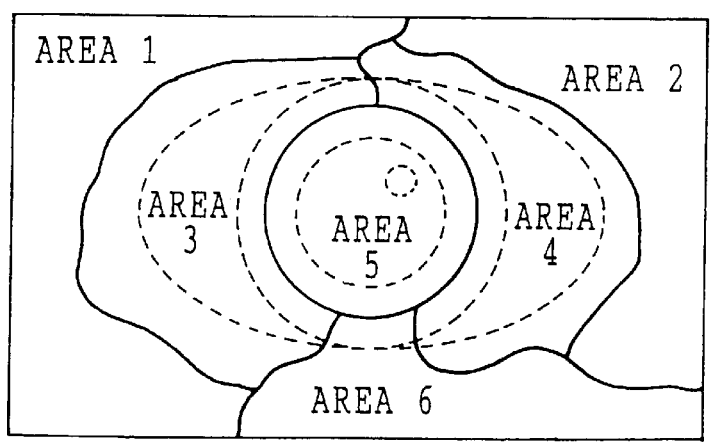
FIG. 6 is a plan view illustrating an example of results of dividing a region which is an object of processing, on the basis of characteristic amount C.

As shown as an example in FIGS. 5 and 6, the value of the characteristic amount C in above formula (1) has a mountain-shaped distribution for each of the partial regions (e.g., the whites of eye regions, the pupil region, the skin region corresponding to the skin) forming the eye region and the peripheral region thereof. For example, the distribution of the characteristic amount C along a line passing along the longitudinal axis direction of the eye region exhibits a distribution in which there are three mountain shapes corresponding to the pupil region and the pair of whites of eye regions at the left and right sides of the pupil region.

In formula (1), the absolute value of the characteristic amount A is used. Therefore, the ability to extract a pupil region of an unsatisfactory color tone improves in a case in which an unsatisfactory color tone arises in a blue color type pupil. (In a case in which the unsatisfactory color tone known as red-eye arises, generally, extraction of the pupil region of a blue color type pupil is more difficult than extraction of the pupil region of a brown color type pupil.) Further, the constant α in formula (1) is preferably within the range $0.3 \leq \alpha \leq 0.5$ (a range confirmed by experimentation), but can be another value as well. Further, the gray value d and the characteristic amount A in formula (1) may be determined by gray value d=(R+G+B)/3, and characteristic amount A=(R−d), on the basis of the R, G, B densities of each pixel.

In next step 108, the region which is the object of processing is divided into plural regions, by using, as a unit, a region in which the characteristic amount C exhibits a mountain-shaped distribution. The division into plural regions can be carried out by, for example, using the pixels having the smallest characteristic amounts C as the border (namely, the pixels positioned so as to correspond to the valleys in the distribution of the characteristic amounts C). As illustrated in FIG. 5, in a pupil region in which red-eye (or gold-eye) arises, the distribution amount C forms a single-peak distribution, and the values of the characteristic amount C at the iris region positioned at the borders between the pupil region and the whites of eye regions are low.

In this way, as shown as an example in FIG. 6, the region can be divided into the pupil region (area 5 in FIG. 6) and the whites of eye regions (areas 3 and 4 in FIG. 6). Note that, even in cases in which red-eye occurs in a pupil region corresponding to a blue color type pupil, the region can be divided into the pupil region and the whites of eye regions, with the iris region as a border, by using the absolute value |A| of the characteristic amount A in above formula (1).

In step 110, for each of the divisional regions obtained in step 108, at least one characteristic amount such as the following is computed: the configuration (e.g., the degree of roundness), the positional relationship with other regions, the distance between the center of gravity position and one of the central positions of the designated regions or the central positions of the designated pupil regions, the surface area ratio with the designated region, the density, the average color hue, or the like. The characteristic amounts of the respective regions are compared, and a region having the most characteristics of a pupil region is selected as an unsatisfactory color tone pupil region.

Note that steps 106 through 110 correspond to the "extracting from the image a pupil region which corresponds to a pupil of a person and in which unsatisfactory color tone has arisen on the image" of the first and the sixth aspects of the present invention (the extracting device of the seventh and eighth aspects, and the first step of the ninth and tenth aspects).

In step 112, a determination is made as to whether extraction of an unsatisfactory color tone pupil region has been carried out for all of the regions which are objects of processing. If the answer to the determination is negative, the routine returns to step 106, and steps 106 through 112 are repeated. In this way, all of the unsatisfactory color tone pupil regions existing in an image can be extracted.

If the determination in step 112 is affirmative, the routine proceeds to step 114, and data of a single unsatisfactory color tone pupil region is fetched. In subsequent step 116, a determination is made as to whether there exists an unsatisfactory color tone pupil region which forms a pair with (corresponds to a pupil of the same person as) the unsatisfactory color tone pupil region whose data was fetched in step 114. In a case in which unsatisfactory color tone exists in each of a pair of pupil regions corresponding to the pupils of the same person, the region which the object of processing is designated by the both eyes designation body. Thus, for example, when the unsatisfactory color tone pupil region whose data is fetched in step 114 is a pupil region extracted from a region which is the object of processing which was designated in the single designation mode, the answer to the determination in step 116 is negative, and the routine proceeds to step 120.

In step 120, a search is carried out for a pupil region, existing in the image, which pupil region forms a pair with the unsatisfactory color tone pupil region whose data was fetched in step 114 and in which no unsatisfactory color tone has arisen (i.e., whose color tone is satisfactory). This search can be carried out as follows for example. On the basis of the position or the size of the unsatisfactory color tone pupil region, a search range is set in which it is estimated that there is a high probability that a pupil region completing the pair exists. The determination as to whether a pupil region having a good color tone exists within the search range can be carried out by the same processings as previous steps 106 through 110, or by searching for a pattern of a particular configuration corresponding to the eye portion of a person (see, for example, JP-A-8-122944, JP-A-8-183925, JP-A-9-138471, and the like).

Figure 7:
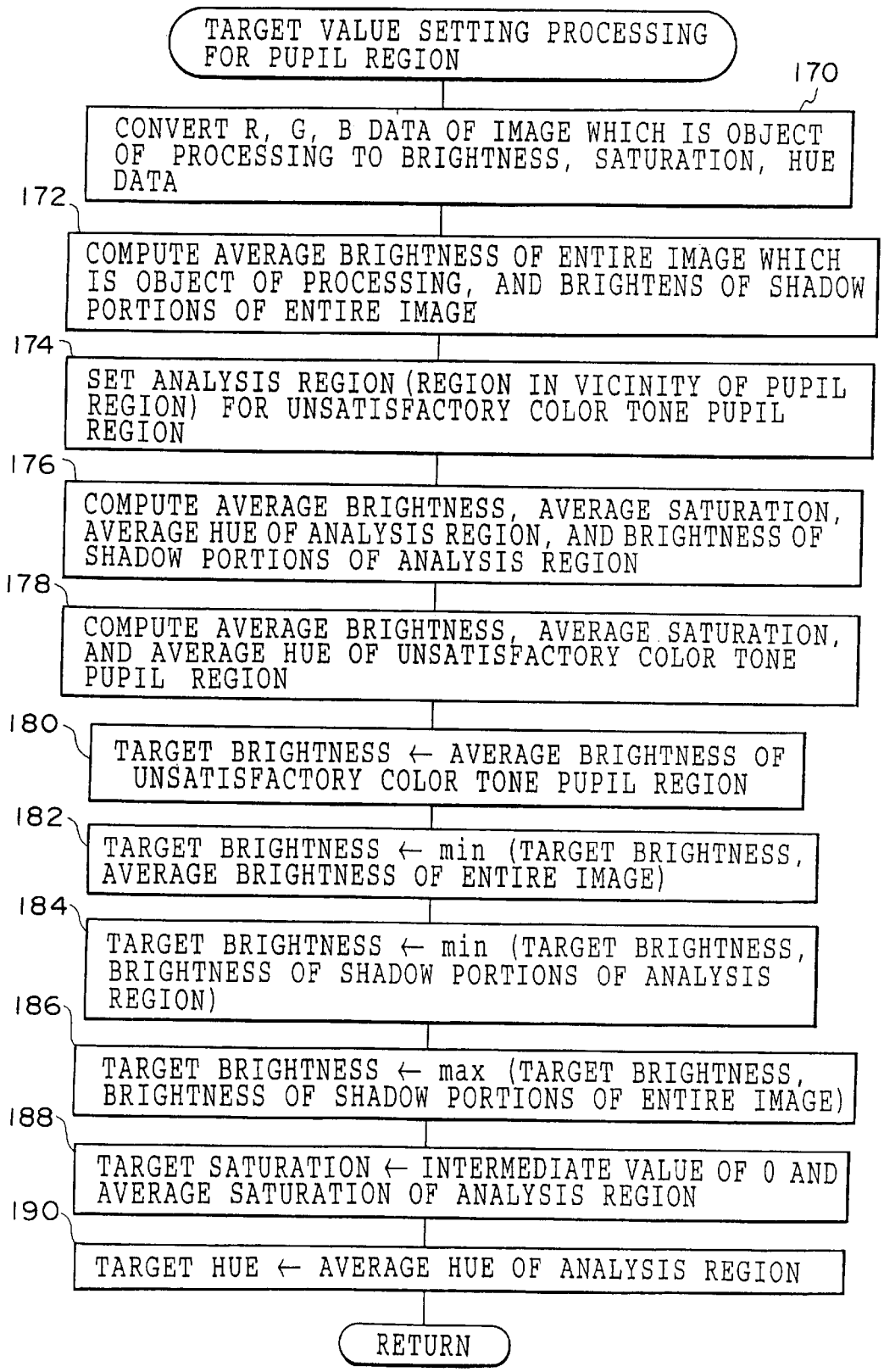
FIG. 7 is a flowchart showing contents of target value setting processing of a pupil region.

In subsequent step 122, a determination is made as to whether a pupil region having good color tone and forming a pair was extracted by the search of step 120. In cases in which there is no pupil region which forms a pair within the image or in cases in which a pupil region forming a pair could not be extracted, the answer to the determination of step 122 is negative, and in step 124, pupil region target value setting processing is carried out. Hereinafter, the pupil region target value setting processing will be described with reference to the flowchart of FIG. 7.

In the pupil region target value setting processing, an unsatisfactory color tone pupil region for which there is no pupil region which completes the pair (or for which no pupil region which completes the pair could be extracted) is the object of processing. In order to appropriately correct the unsatisfactory color tone of such a pupil region, a target value for correction of the unsatisfactory color tone is set on the basis of a characteristic amount of the entire image, a characteristic amount of a region (analysis region) in the vicinity of the pupil region, and a characteristic amount of the pupil region itself.

Namely, in step 170, the image data which is the object of processing (the data expressing the R, G, B densities of the respective pixels of the image) are converted into data expressing the brightness/saturation/hue of each pixel. In subsequent step 172, on the basis of the data which was obtained by the conversion in step 170, an average value of the brightness of the entire image which is the object of processing and the brightness of the shadow portions are computed. (The brightness of the shadow portions is, for example, in a histogram of the brightness values of the entire image, the brightness of those pixels whose cumulative frequency from the low brightness side is from 1% to several %. This corresponds to the "value corresponding to the lowest brightness value" in the present invention.)

In step 174, for the unsatisfactory color tone pupil region (the pupil region whose data was fetched in step 114), a region in the vicinity of (surrounding) the pupil region is set as the analysis region. The analysis region can be, for example, a region in which the center of gravity position corresponds to the central position of the unsatisfactory color tone pupil region and which has a constant surface area ratio with respect to the unsatisfactory color tone pupil region. (A region whose configuration is an arbitrary configuration such as rectangular, oval, circular or the like, can be used.) Then, in step 176, on the basis of the data obtained by conversion in step 170, the average value of the brightness of the analysis region, the average value of the saturation of the analysis region, the average value of the hue of the analysis region, and the brightness of the shadow portions of the analysis region are computed. Further, in step 178, the average value of the brightness of the unsatisfactory color tone pupil region, the average value of the saturation of the unsatisfactory color tone pupil region, and the average value of the hue of the unsatisfactory color tone pupil region are computed.

In step 180, first, the average value of the brightness of the unsatisfactory color tone pupil region is set as the target brightness for the unsatisfactory color tone pupil region. In subsequent step 182, the smaller of the current target brightness and the average value of the brightness of the entire image (i.e., the lower of these brightnesses) is set as the target brightness. Next, in step 184, the smaller of the current target brightness and the brightness of the shadow portions of the analysis region is set as the target brightness. Then, in step 186, the larger of the current target brightness and the brightness of the shadow portions of the entire image (i.e., the higher of these brightnesses) is set as the target brightness.

Then, the target brightness obtained by the processings in steps 180 through 186 is set as the target brightness for the unsatisfactory color tone pupil region. By carrying out the processings of steps 180 through 186, the target brightness for the unsatisfactory color tone pupil region becomes a value which is less than or equal to the average value of the brightness of the entire image, is less than or equal to the brightness of the shadow portions of the analysis region, and is greater than or equal to the brightness of the shadow portions of the entire image.

Because the pupil region has a low brightness, the target brightness of a pupil region in which unsatisfactory color tone arises is less than or equal to the average value of the brightness of the entire image. The target brightness can be made to approach a desirable brightness in the image which is the object of processing. Further, because the intrinsic brightness of the pupil is lower than the brightness of the eyelashes, the eyebrows, and the iris at the periphery of the pupil, the target brightness of the pupil region in which unsatisfactory color tone has arisen is made to be less than or equal to the brightness of the shadow portions of the analysis region. In this way, the target brightness can be made to approach a brightness which is desirable in the image which is the object of processing.

Images which are photographed by using a flash often have low contrast. When the brightness of a pupil region in such an image is lowered excessively, it appears that the brightness is lowered artificially. However, by making the target brightness of the unsatisfactory color tone pupil region greater than or equal to the brightness of the shadow portions of the entire image, the target brightness can be prevented from becoming an unreasonably low value. Accordingly, by the processings of steps 180 through 186, the target brightness of the unsatisfactory color tone pupil region can be set to be an appropriate value which results in the image which is the object of processing being finished with a natural feel.

Further, in step 188, a value, which corresponds to an intermediate value between the saturation 0 and the average value of the saturation of the analysis region, is set as the target saturation for the unsatisfactory color tone pupil region. Flesh-colored regions account for a large percentage of the surface area of the region in a vicinity of the pupil region, and the region in the vicinity of the pupil region also includes regions corresponding to objects which are near to achromatic colors, such as eyelashes and eyebrows. Thus, the average value of the saturation of the analysis region is a saturation value which can be classified as a low saturation in the image. As a result, due to this step 188, the target saturation of the unsatisfactory color tone pupil region can be made to be value which is appropriate for the image to be finished with a natural feel. Further, instead of the intermediate value, for example, a value which is obtained by subtracting a predetermined value from the average value of the saturation of the analysis region can be used.

In step 190, the average value of the hue of the analysis region is set as the target hue for the unsatisfactory color tone pupil region. Because flesh-colored regions account for a large percentage of the surface area of the region in the vicinity of the pupil region, the average value of the hue of the analysis region is a value corresponding to a warm color. Due to the processings of step 190, the target hue of the unsatisfactory color tone pupil region (the target value of the average value of the hue of the pupil region) can be made to be appropriate values (values corresponding to the hues of warm colors) which result in the image being finished with a natural feel and in good results of sense taste evaluation. Further, the target hue may be a value which is different from the average value of the hue of the analysis region by the predetermined value.

The above-described target value setting processing of the pupil region corresponds to the "determining the target value of the characteristic amount of the pupil region" of the first aspect of the present invention (and corresponds to the first determining device in the seventh aspect and the second step in the ninth aspect). More specifically, the "determining the target value of the characteristic amount of the pupil region" of the first aspect corresponds to the second aspect of the present invention. Moreover, steps 180 through 186 correspond to the third aspect of the invention, step 188 corresponds to the fourth aspect of the invention, and step 190 corresponds to the fifth aspect of the invention. When the setting of the target brightness, the target saturation and the target hue for the unsatisfactory color tone pupil region have been completed as described above, processing moves on to step 130 in the flowchart of FIG. 2.

When a pupil region having satisfactory color tone and completing a pair is extracted by the search of step 120, the determination in step 122 is affirmative, and the process moves on to step 126 where the average brightness, the average saturation and the average hue of the entire satisfactory color tone pupil region completing the pair are computed. Then, in step 128, on the basis of the average brightness, the average saturation and the average hue determined in step 126, the target brightness, the target saturation and the target hue of the unsatisfactory color tone pupil region are set, and the routine moves on to step 130.

Note that steps 126 and 128 correspond to "determining a target value of a characteristic amount of the pupil region in which unsatisfactory color tone has arisen, such that the characteristic amounts of the pair of pupil regions are substantially the same value" of the sixth aspect of the present invention (as well as correspond to the second determining device of the eighth aspect and the second step of the tenth aspect).

The target brightness, the target saturation, and the target hue of the unsatisfactory color tone pupil region may be set to the same values as the average brightness, the average saturation and the average hue of the entire pupil region having a satisfactory color tone. Or, on the basis of the differences in the characteristic amounts of regions in the vicinities of the pair of pupil regions corresponding to the pupils of a single person, the target brightness, the target saturation, and the target hue of the unsatisfactory color tone pupil region may be set so as to be slightly different from the average brightness, the average saturation and the average hue of the overall pupil region having a satisfactory color tone. In this way, the finish (the brightness, saturation, hue, and the like) after correcting the unsatisfactory color tone of the unsatisfactory color tone pupil region are substantially the same as those of the pupil region completing the pair, target values for the unsatisfactory color tone pupil region can be set such that a pair of pupil regions corresponding to the pupils of a single person can be finished with a natural feel.

Figure 8:
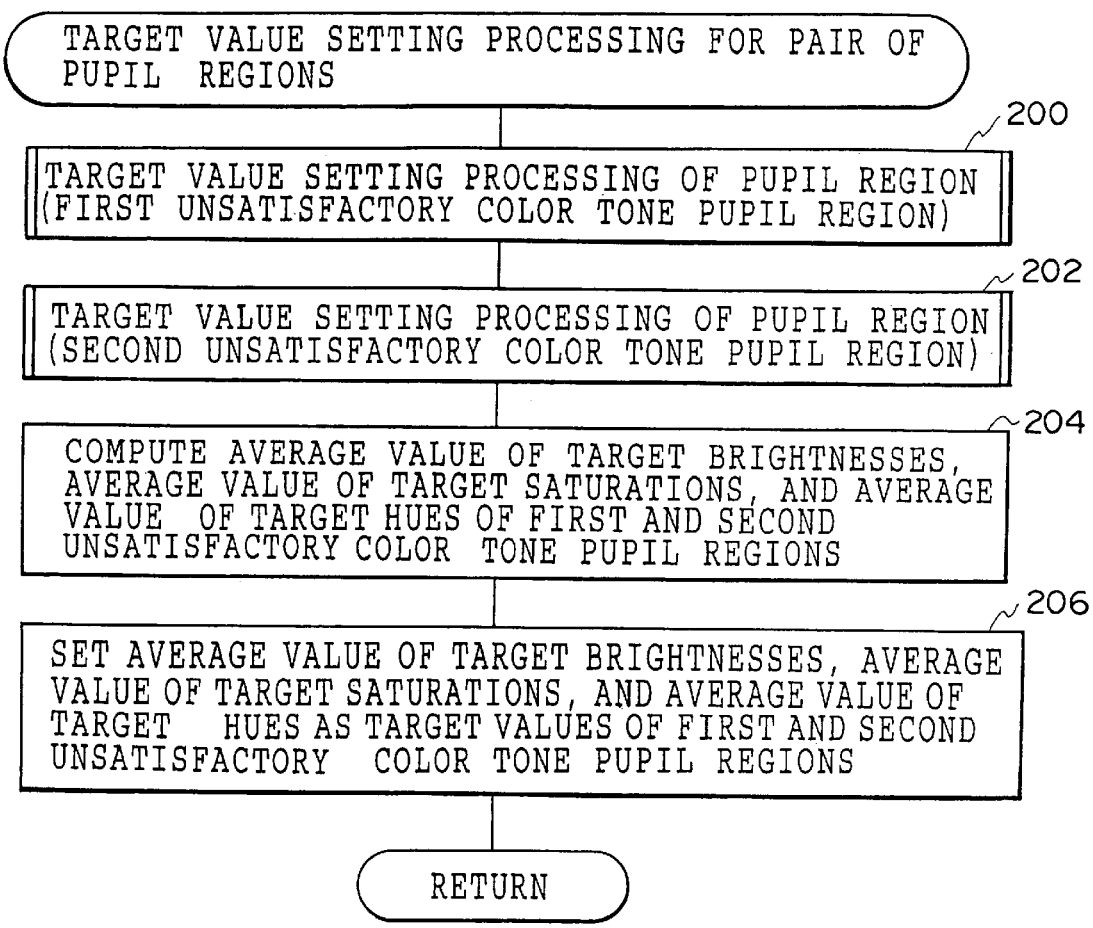
FIG. 8 is a flowchart showing contents of target value setting processing of a pair of pupil regions.

In a case in which there is an unsatisfactory color tone pupil region which forms a pair with the unsatisfactory color tone pupil region whose data was fetched in step 114, the determination in step 116 is affirmative, and the routine moves on to step 118 where target value setting processing for the pair of pupil regions is carried out. Hereinafter, this target value setting processing for a pair of pupil regions will be explained with reference to the flowchart in FIG. 8.

In the target value setting processing for a pair of pupil regions, first, in step 200, the previously described pupil region target value setting processing (of FIG. 7) is carried out on one pupil region of the pair of pupil regions in each of which unsatisfactory color tone has arisen. (For convenience of explanation, this one pupil region will be referred to as the first unsatisfactory color tone pupil region.) Then, the target brightness, target saturation and target hue for the first unsatisfactory color tone pupil region are set. Next, in step 202, the pupil region target value setting processing (FIG. 7) is carried out for the other pupil region (second unsatisfactory color tone pupil region), and then the target brightness, the target saturation and the target hue are set for the second unsatisfactory color tone pupil region.

In subsequent step 204, the average value of the target brightness, the average value of the target saturation and the average value of the target hue of the first unsatisfactory color tone pupil region and the second unsatisfactory color tone pupil region are computed. Then, in step 206, the average value of the target brightness, the average value of the target saturation and the average value of the target hue which were determined in step 204 are set as the target brightness, the target saturation and the target hue of the first unsatisfactory color tone pupil region and the second unsatisfactory color tone pupil region. The routine then moves on to step 130 in the flowchart of FIG. 2.

The target value setting processing for a pair of pupil regions corresponds to the "determining a target value of a characteristic amount for a pupil region in which unsatisfactory color tone has arisen, such that the characteristic amounts of the pair of pupil regions are substantially the same value" of the sixth aspect of the present invention (the second determining device of the eighth aspect and the second step of the tenth aspect).

In this way, in the target value setting processing for a pair of pupil regions, the pupil region target value setting processing (of FIG. 7) is carried out on each of the pupil regions of the pair of pupil regions in each of which unsatisfactory color tone has arisen, such that the target values are set. Thereafter, the average values of the respective target values are set for each pupil region of the pair of pupil regions. Thus, the finishes (brightnesses, saturations, hues, and the like) of the pair of pupil regions after the unsatisfactory color tones thereof have been corrected are substantially the same, and the target values for the pair of pupil regions can be set such that the pair of pupil regions can be finished with a natural feel.

Figure 2A:
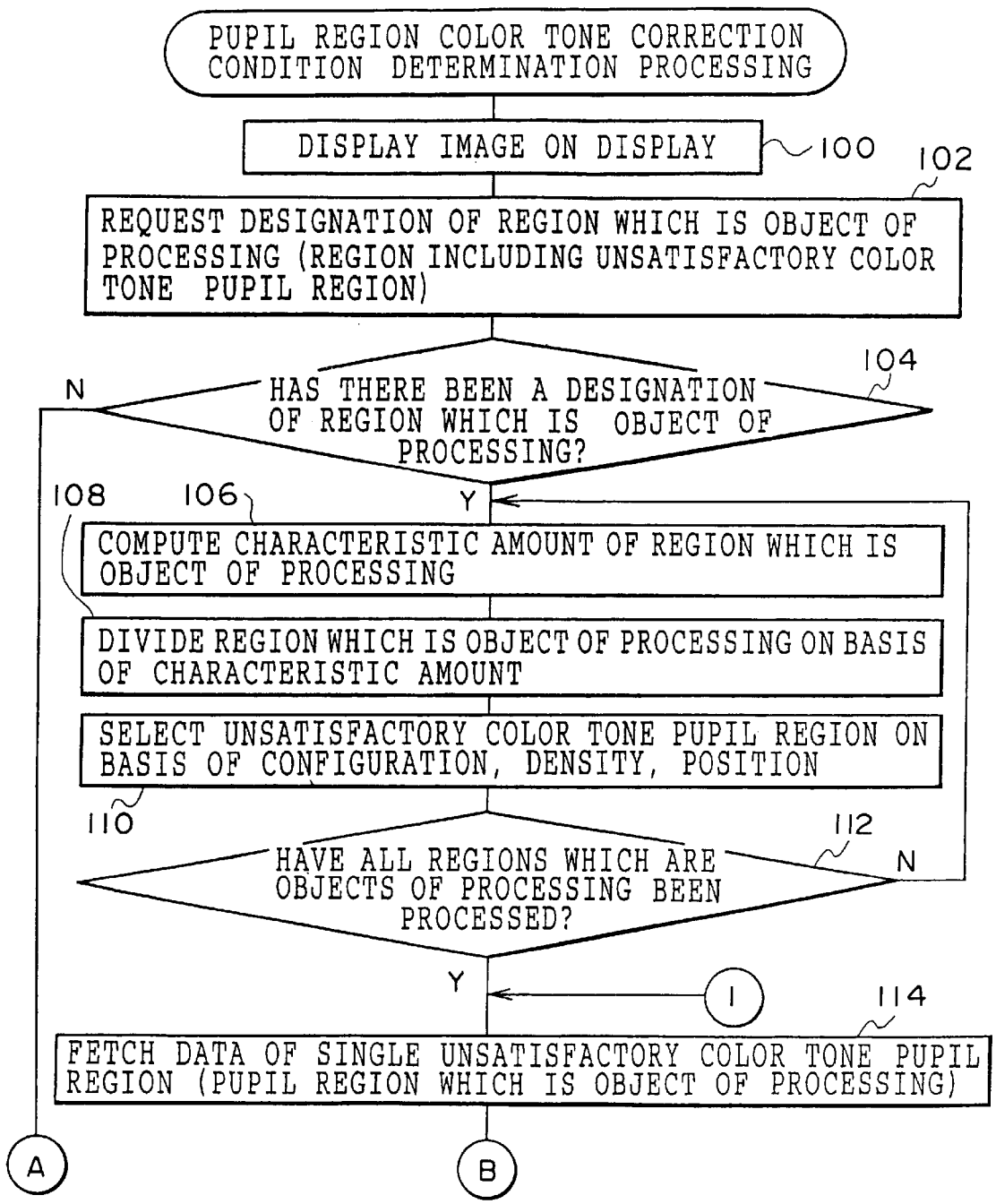
FIGS. 2A through 2C are flowcharts showing contents of pupil region color tone correction condition determining processing relating to the embodiment of the present invention.
Figure 2B:
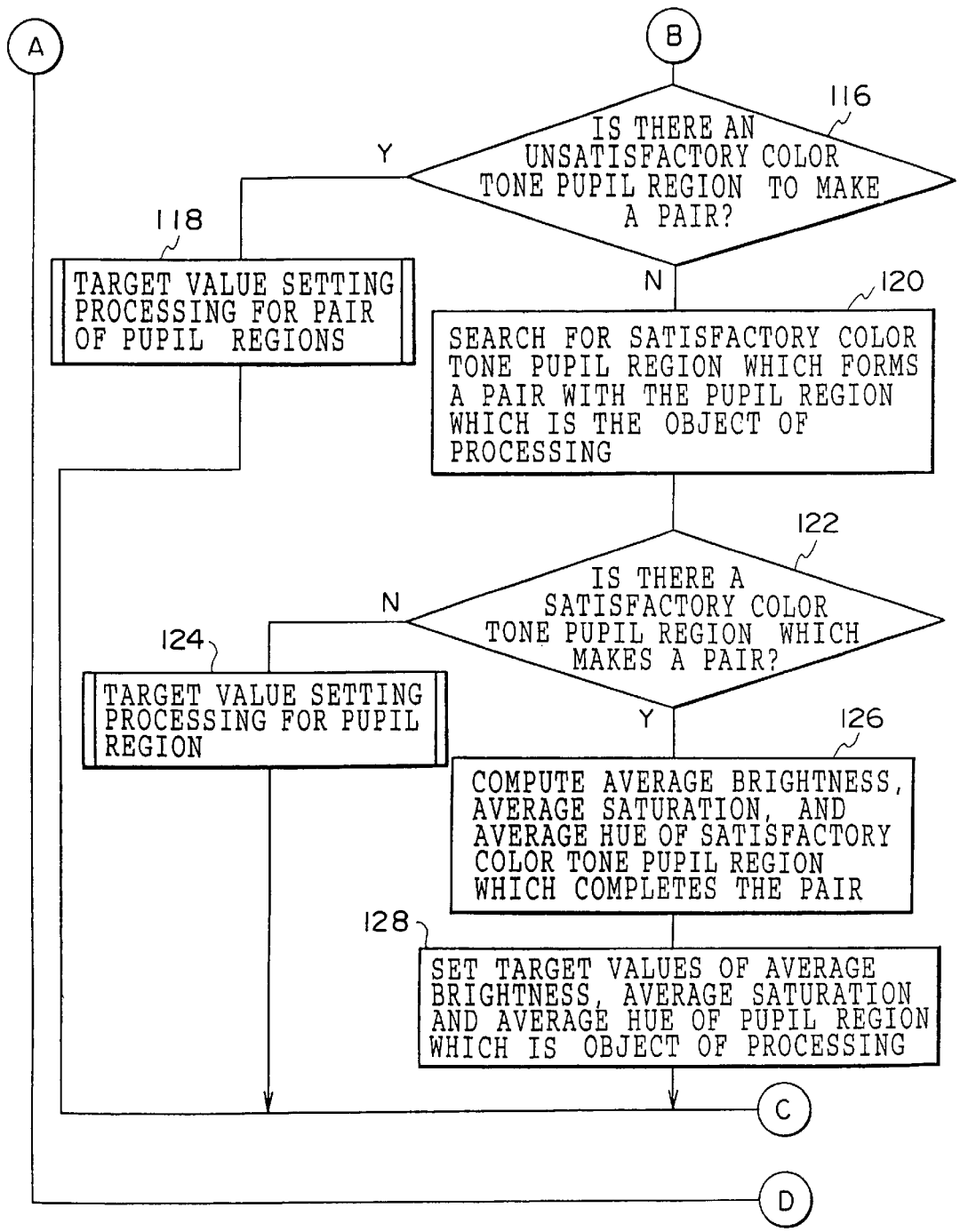
Figure 2C:
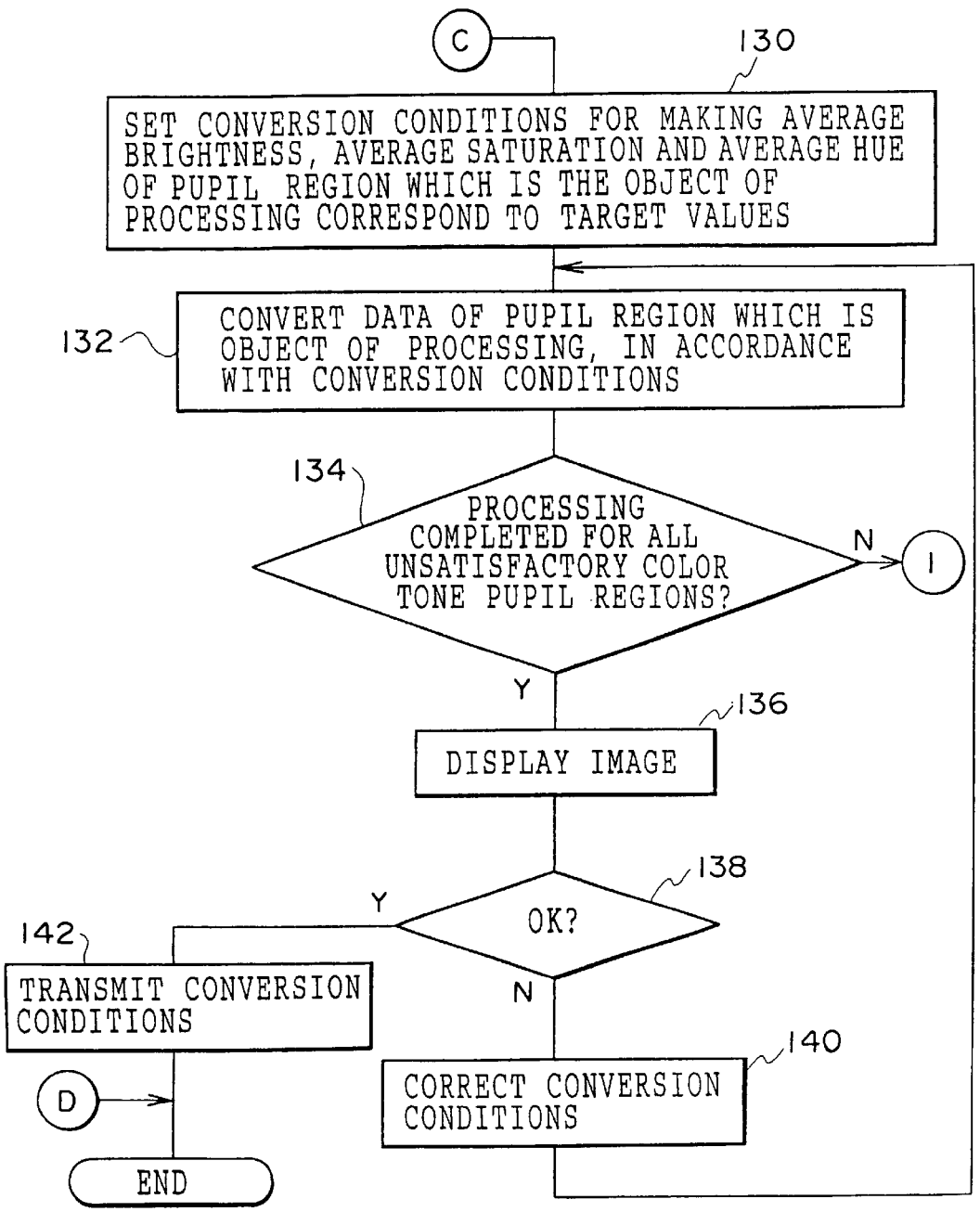

In step 130 of the flowchart of FIG. 2, the conversion conditions for making the average brightness, the average saturation and the average hue of the unsatisfactory color tone pupil region substantially equal to the target values are set on the basis of the target values of the brightness, saturation and hue of the unsatisfactory color tone pupil region set as described above. (The conversion conditions may be conversion conditions for the brightness, saturation, hue data, or may be conversion conditions for the R, G, B data.) In the present embodiment, the unsatisfactory color tone of the pupil region is corrected by matrix conversion. Thus, in step 130, as the conversion conditions, the coefficients of a matrix (e.g., a 3×3 matrix) in matrix computation for correcting the unsatisfactory color tone of the pupil region are set. Then, the set conversion conditions are stored in a memory or the like in correspondence with information (position, size of the pupil region in the image, or the like) for specifying the pupil region which is the object of unsatisfactory color tone correction.

In step 132, among the data of the image which is the object of processing, the data of the unsatisfactory color tone pupil region for which the conversion conditions have been set as described above, is converted in accordance with the set conversion conditions. In subsequent step 134, a determination is made as to whether the conversion conditions have been set for all of the extracted unsatisfactory color tone pupil regions. If the answer to the determination is negative, the routine returns to step 114, and the processings of steps from step 114 on are repeated. In this way, the conversion conditions for correcting the unsatisfactory color tone can be set and stored for all of the unsatisfactory color tone pupil regions extracted from the image which is the object of processing.

When the answer to the determination in step 134 is affirmative, the routine moves on to step 136 where, by using the data of the pupil regions which has been converted in accordance with the conversion conditions in step 132, the image which is the object of processing (the image in which the unsatisfactory color tone of the pupil region(s) has (have) been corrected) is displayed again on the display 70, and a message requesting that the operator inspect the displayed image is also displayed on the display 70. In subsequent step 138, a determination is made by the operator as to whether or not the displayed image is satisfactory ("OK"). The operator refers to the image displayed on the display 70, and judges whether or not the unsatisfactory color tone of the pupil region, in which an unsatisfactory color tone was present before the image was displayed again, has been corrected appropriately. The operator then inputs the results of inspection by operating the keyboard 71 or the like.

When the operator judges that the unsatisfactory color tone of the pupil region has not been suitably corrected, the operator inputs, as the results of inspection and via the keyboard 71, information for designating the pupil region whose unsatisfactory color tone has been judged to have not been corrected appropriately, as well as information indicating how the color tone of the pupil region should be corrected. (This information may be information indicating how the target values should be corrected, or information indicating how the conversion conditions should be corrected.) In this case, the answer to the determination in step 138 is negative, and on the basis of information inputted from the operator, the conversion conditions (the stored conversion conditions) for the pupil region, for which it was judged that the unsatisfactory color tone was not corrected sufficiently, are corrected in step 140. Thereafter, the routine returns to step 132. In this way, correction of the color tone of the pupil region is carried out again in accordance with the corrected conversion conditions, and the image is displayed again.

When the operator judges that the unsatisfactory color tone of the pupil region has been corrected appropriately and inputs, via the keyboard 71 and as the results of inspection, information expressing that the image has been satisfactorily corrected ("inspection OK"), the determination in step 138 is affirmative, and the routine moves on to step 142 where the conversion conditions (and information for specifying the pupil region which is the object of unsatisfactory color tone correction) stored in the memory or the like are, together with information (e.g., the frame number of the like) for specifying the film image which is the object of processing, forwarded to the image processor 40 via the auto set-up engine 44, and the processing is completed.

At the image processor 40, each time the conversion conditions for correcting the unsatisfactory color tone of a pupil region are forwarded, the conversion conditions are stored in a memory or the like. Then, when fine scanning is carried out on the respective film images recorded on the photographic film 26 and the fine scan image data of the respective film images is inputted, on the basis of the information for specifying the film image, a determination is made as to whether the conversion conditions for the film image corresponding to the fine scan image data are stored in the memory or the like.

If corresponding conversion conditions are stored in the memory or the like, the conversion conditions are fetched from the memory or the like, and the fetched conversion conditions are set at a computation section for carrying out matrix computation. On the basis of the information for specifying the pupil region which is the object of unsatisfactory color tone correction, the data corresponding to the pupil region is fetched from the image data, and is inputted in order to the computation section in units of the data of each pixel.

In this way, the data corresponding to the unsatisfactory color tone pupil region is converted, in accordance with the conversion conditions determined by the previously-described pupil region color tone correction condition determination processing (FIG. 2), such that the average value of the brightness, the average value of the saturation, and the average value of the hue of the unsatisfactory color tone pupil region substantially correspond to the respective target values. The unsatisfactory color tone of the pupil region is corrected in accordance with the conversion conditions. Further, the data of each pixel within the pupil region which is the object of unsatisfactory color tone correction is converted by constant conversion conditions. Thus, variations among the pixels before unsatisfactory color correction can be maintained to a certain extent, and the unsatisfactory color tone of the pupil region can be corrected such that the image is finished with a natural feel.

The above-described conversion may be carried out by directly converting the fine scan image data (the data expressing the R, G, B densities of each pixel). Or, the fine scan image data can be converted into data expressing the brightness, saturation and hue of each pixel, and thereafter, this data can be converted. The correction of the unsatisfactory color tone of the pupil region by the image processor 40, as well as above-described steps 130 and 132, correspond to the "correcting a value of each pixel within a pupil region in which unsatisfactory color tone has arisen, such that a characteristic amount of the pupil region in which the unsatisfactory color tone has arisen substantially corresponds to a target value" of the first and sixth aspects (as well as correspond to the correction device of the seventh and eighth aspects, and the third step of the ninth and tenth aspects).

Note that, in the color tone correction of the pupil region, the brightness within the pupil region may be further corrected such that the brightness in the pupil region varies so as to gradually decrease from the central portion of the pupil region toward the peripheral portion thereof, as the applicants of the present application have proposed in Japanese Patent Application No. 10-166973. Further, as the applicants of the present application have proposed in Japanese Patent Application No. 10-166973, a catch light pattern may be adhered, or further correcting the brightness within the pupil region may be carried out, such that high luminance regions (highlight regions) arise in portions corresponding to catch light within the pupil region.

Further, in the above description, the average value of the brightness and the brightness of the shadow portions are used as the characteristic amounts of the region including the majority of the image. The average value of the brightness, the average value of the saturation, the average value of the hue, and the brightness of the shadow portions are used as the characteristic amounts of the region in the vicinity of the pupil portion in which unsatisfactory color tone has arisen. Moreover, the average value of the brightness, the average value of the saturation, and the average value of the hue are used as the characteristic amounts of the pupil region in which unsatisfactory color tone has arisen. However, these are merely examples, and it goes without saying that arbitrary characteristic amounts can be used.

Further, in the above description, when a region which is the object of processing which is designated by the operator is designated, it is judged that there is an unsatisfactory color tone pupil region in the image which is the object of processing, and the unsatisfactory color tone pupil region is extracted from the designated region which is the object of processing. However, the present invention is not limited to the same. The judgment as to whether or not there exists an unsatisfactory color tone pupil region and the extraction of the region in a case in which it is judged that there is an unsatisfactory color tone pupil region may be carried out automatically. In this case, the computation of the conversion conditions for the unsatisfactory color tone pupil region can be carried out by the auto set-up engine 44.

Moreover, in the above, reading of the film image is carried out twice. On the basis of the image data obtained by the first reading (prescanning) at a low resolution, the conversion conditions for correcting the unsatisfactory color tone of the pupil region are determined. The image data obtained by the second reading (fine scanning) at a high resolution are converted in accordance with the conversion conditions. However, the relationship between the number of times reading is carried out and the resolutions each time reading is carried out is not limited to the above.

In the above description, the entire image is used as the "region including the majority of the image" relating to the present invention. However, the present invention is not limited to the same. For example, in a case in which processing is carried out on an image whose image quality is poor due to an insufficient amount of light at the peripheral portions of the image (such as a image which is photographed by using a disposable camera), the "region including the majority of the image" may be, for example, a region of the entire image other than the peripheral portion (or a region which is separated by a given distance or more from the center of the image).

A case was described above in which the present invention is applied to image processing of image data obtained by reading a film image recorded on the photographic film 26. However, the present invention is not limited to the same and, for example, may also be applied to the image processing of image data obtained by photographing by using a digital still camera or a digital video camera, or image data obtained by reading by a scanner or the like an image recorded on a recording medium other than a photographic film.

In the above description, the pupil region color tone correction condition determination program of the present embodiment is initially stored on the information storage medium 72 which serves as the recording medium relating to the present invention. By installing the program from the information storage medium 72 into the image processing device 14 relating to the present embodiment and executing the program, the image processing device 14 functions as the image processing device of the present invention. However, the image processing device 14 (or the image processing system 10 of the present embodiment) may be provided with a function for communicating with another information processing device (e.g., a network server) via a communications medium (an optical fiber or a wireless circuit) in a public telephone circuit or a computer network system (e.g., a LAN, the internet, a wireless communications network, or the like). The program may be initially stored in the storage device of the information processing device, and the program can be transmitted to the image processing device 14 by the communications medium (the transmission medium relating to the present invention) from the information processing device. By the image processing device 14 installing the transmitted program into a storage means such as a hard disk and executing the program, the image processing device 14 can function as the image processing device relating to the present invention.

Although the present inventor has been described with respect to the correction of unsatisfactory color tone of the pupils of human, the present invention can be applied to the correction of unsatisfactory color tone of the pupils of animals.

As described above, in the first through seventh aspects of the present invention, a pupil region which corresponds to the pupil of a person and in which unsatisfactory color tone has arisen is extracted, and on the basis of a characteristic amount of each of a region including a majority portion of the image, a region in a vicinity of the pupil region and the pupil region, target values of characteristic amounts of the pupil region are determined, and the values of each pixel within the pupil region are corrected such that the characteristic amounts of the pupil region are substantially equal to the target values. Thus, an excellent effect is achieved in that the unsatisfactory color tone of the pupil region within the image can be corrected such that the image is finished with a natural feel.

In the third aspect of the present invention, in the second aspect, the target value of the average value of the brightness of the pupil region in which the unsatisfactory color tone has arisen is less than or equal to an average value of brightness of a region including a majority portion of the image, and is less than or equal to a value corresponding to the lowest value of the brightness in a region in a vicinity of a pupil region, and is greater than or equal to a value corresponding to the lowest value of the brightness in a region including the majority portion of the image. Thus, in addition to the above effect, an excellent effect is achieved in that the target value of the average value of the brightness of the pupil region in which the unsatisfactory color tone has arisen can be made to be a value which is appropriate for finishing the image with a natural feel.

In the fourth aspect of the present invention, in the second aspect, the target value of the average value of the saturation of the pupil region in which unsatisfactory color tone has arisen is less than or equal to the average value of the saturation in a region in a vicinity of the pupil region and is greater than or equal to a degree of achromaticity. Thus, in addition to the above effects, an excellent effect is achieved in that the target value of the average value of the saturation of the pupil region in which the unsatisfactory color tone has arisen can be made to be a value which is appropriate for the image to be finished with a natural feel.

In the fifth aspect of the present invention, in the second aspect, the target value of the average value of the hue of the pupil region in which the unsatisfactory color tone has arisen is substantially equal to the average value of the hue of a region in the vicinity of the pupil region. Thus, in addition to the above effects, an excellent effect is achieved in that the target value of the average value of the hue of the pupil region in which the unsatisfactory color tone has arisen can be made to be a value which is appropriate for the image to be finished with a natural feel and which results in satisfactory results of the evaluation of functions.

In the sixth and the eighth aspects of the present invention, in a case in which a pair of pupil regions corresponding to the pupils of the same person exist within an image and unsatisfactory color tone arises in at least one of the pair of pupil regions, a target value of a characteristic amount of the pupil region in which the unsatisfactory color tone has arisen is determined such that the characteristic amounts of the pair of pupil regions become substantially the same value, and the values of the respective pixels in the pupil region in which the unsatisfactory color tone has arisen are corrected such that the characteristic amount of the pupil region in which the unsatisfactory color tone has arisen becomes substantially the same as the target value. Thus, an excellent effect is achieved in that the unsatisfactory color tone of the pupil region can be corrected such that the pair of pupil regions within the image, which correspond to the pupils of the same person, are finished with a natural feel.

In the inventions of the ninth and eleventh aspects, a program for executing the following steps at a computer is recorded on a recording medium or is transmitted: a first step of extracting a pupil region which corresponds to the pupil of a person and in which unsatisfactory color tone has arisen; a second step of determining a target value of a characteristic amount of the pupil region on the basis of a characteristic amount of a region including the majority portion of the image, a characteristic amount of a region including a vicinity of the pupil region, and a characteristic amount of the pupil region; and a third step of correcting the values of the respective pixels within the pupil region such that the characteristic amount of the pupil region is substantially equal to the target value. Thus, an excellent effect is achieved in that the unsatisfactory color tone of the pupil region within the image can be corrected such that the image is finished with a natural feel.

In the tenth and twelfth aspects of the present invention, a program for executing the following steps at a computer is recorded on a recording medium or is transmitted: a first step of extracting a pupil region corresponding to the pupil of a person and in which unsatisfactory color tone has arisen; a second step of, in a case in which a pair of pupil regions corresponding to the pupils of the same person exist in an image and unsatisfactory color tone has arisen in at least one of the pair of pupil regions, determining a target value of characteristic amount for the pupil region in which the unsatisfactory color tone has arisen, such that the characteristic amounts of the pair of pupil regions become substantially the same value; and a third step of correcting the values of the respective pixels in the pupil region in which the unsatisfactory color tone has arisen, such that the characteristic amount of the pupil region in which the unsatisfactory color tone has arisen is substantially the same as the target value. Thus, an excellent effect is achieved in that the unsatisfactory color tone of a pupil region can be corrected such that a pair of pupil regions in an image, which pupil portions correspond to the pupils of a single person, are finished with a natural feel.

What is claimed is:

1. An image processing method comprising the steps of:
   extracting, from an image, a pupil region which corresponds to a pupil of a person and in which unsatisfactory color tone has arisen on the image;
   determining a target value of a characteristic amount of the pupil region in which unsatisfactory color tone has arisen, on the basis of a characteristic amount of a region including a majority of the image, a characteristic amount of a region in a vicinity of the pupil region in which unsatisfactory color tone has arisen, and a characteristic amount of the pupil region in which unsatisfactory color tone has arisen; and
   correcting a value of each pixel within the pupil region in which unsatisfactory color tone has arisen, thereby making the characteristic amount of the pupil region in which unsatisfactory color tone has arisen substantially equal to the target value.

2. The image processing method of claim 1, wherein as the characteristic amount of the region including the majority of the image, the characteristic amount of the region in the vicinity of the pupil region in which unsatisfactory color tone has arisen, and the characteristic amount of the pupil region in which unsatisfactory color tone has arisen, at least one of an average value of brightness, an average value of saturation, an average value of hue, and a value corresponding to a minimum value of brightness is used, and as the target value of the characteristic amount of the pupil region in which unsatisfactory color tone has arisen, a target value of the average value of brightness, a target value of the average value of saturation, and a target value of the average value of hue are determined.

3. The image processing method of claim 2, wherein the target value of the average value of brightness of the pupil region in which unsatisfactory color tone has arisen is determined so as to be less than or equal to the average value of brightness in the region including the majority of the image, and so as to be less than or equal to the value corresponding to the minimum value of brightness of the region in the vicinity of the pupil region in which unsatisfactory color tone has arisen, and so as to be greater than or equal to the value corresponding to the minimum value of brightness of the region including the majority of the image.

4. The image processing method of claim 2, wherein the target value of the average value of the saturation of the pupil region in which unsatisfactory color tone has arisen is determined so as to be less than or equal to the average value of saturation of the region in the vicinity of the pupil region in which unsatisfactory color tone has arisen and such that the saturation is not zero.

5. The image processing method according to claim 2, wherein the target value of the average value of the hue of the pupil region in which unsatisfactory color tone has arisen is determined so as to be substantially equal to the average value of hue of the region in the vicinity of the pupil region in which unsatisfactory color tone has arisen.

6. The image processing method of claim 1, wherein
   in a case in which a pair of pupil regions corresponding to a pair of pupils of the person exist in the image and unsatisfactory color tone has arisen in at least one pupil region of the pair of pupil regions, the determining step determines the target value of the characteristic amount of the pupil region in which unsatisfactory color tone has arisen such that characteristic amounts of the pair of pupil regions become substantially a same value.

7. An image processing device comprising:
   an extracting device for extracting, from an image, a pupil region which corresponds to a pupil of a person and in which unsatisfactory color tone has arisen on the image;
   a first determining device for determining a target value of a characteristic amount of the pupil region in which unsatisfactory color tone has arisen, on the basis of a characteristic amount of a region including a majority of the image, a characteristic amount of a region in a vicinity of the pupil region in which unsatisfactory color tone has arisen, and a characteristic amount of the pupil region in which unsatisfactory color tone has arisen; and
   a correcting device for correcting a value of each pixel in the pupil region in which unsatisfactory color tone has arisen, thereby making the characteristic amount of the pupil region in which unsatisfactory color tone has arisen substantially equal to the target value.

8. The image processing device of claim 7, further comprising:

a second determining device for, in a case in which a pair of pupil regions corresponding to a pair of pupils of the person exist in the image and unsatisfactory color tone has arisen in at least one pupil region of the pair of pupil regions, determining a target value of a characteristic amount of the pupil region in which unsatisfactory color tone has arisen such that characteristic amounts of the pair of pupil regions become substantially a same value; and a correcting device for correcting a value of each pixel in the pupil region in which unsatisfactory color tone has arisen, such that the characteristic amount of the pupil region in which unsatisfactory color tone has arisen is substantially equal to the target value.

9. A recording medium on which is recorded a to be executed, at a computer, a processing comprising:

instructions for extracting, from an image, a pupil region which corresponds to a pupil of a person and in which unsatisfactory color tone has arisen on the image;

instructions for determining a target value of a characteristic amount of the pupil region in which unsatisfactory color tone has arisen, on the basis of a characteristic amount of a region including a majority of the image, a characteristic amount of a region in a vicinity of the pupil region in which unsatisfactory color tone has arisen, and a characteristic amount of the pupil region in which unsatisfactory color tone has arisen; and instructions for correcting a value of each pixel within the pupil region in which the unsatisfactory color tone has arisen, thereby making the characteristic amount of the pupil region in which the unsatisfactory color tone has arisen is substantially equal to the target value.

10. The recording medium of claim 9, further comprising:

instructions for, in a case in which a pair of pupil regions corresponding to a pair of pupils of the person exist in the image and unsatisfactory color tone has arisen in at least one pupil region of the pair of pupil regions, determining a target value of a characteristic amount for the pupil region in which the unsatisfactory color tone has arisen such that characteristic amounts of the pair of pupil regions become substantially a same value.

11. A transmission medium for transmitting a program for executing, at a computer, a processing comprising:

instructions for extracting, from an image, a pupil region which corresponds to a pupil of a person and in which unsatisfactory color tone has arisen on the image;

instructions for determining a target value of a characteristic amount of the pupil region in which unsatisfactory color tone has arisen, on the basis of a characteristic amount of a region including a majority of the image, a characteristic amount of a region in a vicinity of the pupil region in which unsatisfactory color tone has arisen, and a characteristic amount of the pupil region in which unsatisfactory color tone has arisen; and a third step of correcting a value of each pixel within the pupil region in which unsatisfactory color tone has arisen, thereby making the characteristic amount of the pupil region in which unsatisfactory color tone has arisen is substantially equal to the target value.

12. The transmission medium of claim 11, further comprising:

instructions for, in a case in which a pair of pupil regions corresponding to a pair of pupils of the person exist in the image and unsatisfactory color tone has arisen in at least one pupil region of the pair of pupil regions, determining a target value of a characteristic amount for the pupil region in which the unsatisfactory color tone has arisen such that characteristic amounts of the pair of pupil regions become substantially a same value.

13. The image processing method of claim 4, wherein the target value of the average value of the saturation of the pupil region in which unsatisfactory color tone has arisen is determined so as to be substantially half of the average value of saturation of the region in the vicinity of the pupil region in which unsatisfactory color tone has arisen.

14. An image processing method comprising the steps of:

extracting, from an image, a pupil region which corresponds to a pupil of a person having an unsatisfactory color tone;

determining at least one target value corresponding to an image characteristic of the pupil region based on values of image characteristics of a majority region of the image and a region of the image in a vicinity of the pupil region, respectively; and correcting a value of each pixel within the pupil region in order to make at least one value of an image characteristic of the pupil region substantially equal to the at least one target value.

15. The image processing method of claim 14, wherein the determining step uses, as the image characteristics of the majority region of the image and the region of the image in the vicinity of the pupil region, at least one of an average brightness, an average saturation, an average hue, and a minimum brightness, and the correcting step corrects the value of each pixel in order to make the value of at least one of average brightness, average saturation, and average hue in the pupil region substantially equal to a corresponding determined target value.

16. The image processing method of claim 15, wherein the determining step determines a target value corresponding to the average brightness of the pupil region, the target value being determined so as to be less than or equal to a value corresponding to the average brightness in the majority region of the image, and so as to be less than or equal to a value corresponding to the minimum brightness of the region of the image in the vicinity of the pupil region, and so as to be greater than or equal to a value corresponding to the minimum brightness of the majority region of the image.

17. The image processing method of claim 15, wherein the determining step determines a target value corresponding to the average saturation of the pupil region, the target value being determined so as to be less than or equal to a value corresponding to the average saturation of the region in the vicinity of the pupil region in which unsatisfactory color tone has arisen and such that the saturation is not zero.

18. The image processing method according to claim 15, wherein the determining step determines a target value corresponding to the average hue of the pupil region, the target value being determined so as to be substantially equal to a value corresponding to the average hue of the region of the image in the vicinity of the pupil region.

19. The image processing method of claim 14, wherein the extracted pupil region and another pupil region make up a pair of pupil regions corresponding to a pair of pupils of the person in the image, further comprising:

correcting a value of each pixel in the other pupil region in order to make at least one value of an image characteristic substantially equal to the at least one determined target value.

* * * * *